United States Patent [19]
Nakatsuka

[11] Patent Number: 5,323,445
[45] Date of Patent: Jun. 21, 1994

[54] MULTI-LOCATION TELEVISION CONFERENCE SYSTEM

[75] Inventor: Kunio Nakatsuka, Amagasaki, Japan

[73] Assignee: Mitsubishi Denki Kabushiki Kaisha, Tokyo, Japan

[21] Appl. No.: 846,146

[22] Filed: Mar. 5, 1992

[30] Foreign Application Priority Data

Mar. 7, 1991 [JP] Japan .................................. 3-065255
Apr. 12, 1991 [JP] Japan .................................. 3-106503

[51] Int. Cl.$^5$ ....................... H04M 11/00; H04N 7/14
[52] U.S. Cl. ........................ 348/15; 379/94; 379/202; 370/62
[58] Field of Search ............ 379/53, 54, 96, 94, 379/202, 204, 205, 206; 358/85, 86; 370/62, 84, 110.1, 85.12, 85.15, 79

[56] References Cited

U.S. PATENT DOCUMENTS

| | | | |
|---|---|---|---|
| 5,065,393 | 11/1991 | Sibbitt et al. ......................... | 379/54 |
| 5,136,581 | 8/1992 | Muehrcke .............................. | 379/54 |
| 5,138,614 | 8/1992 | Baumgartner et al. ............... | 370/62 |

FOREIGN PATENT DOCUMENTS

| | | |
|---|---|---|
| 0453128 | 10/1991 | European Pat. Off. .............. 370/62 |
| 63-240253 | 10/1988 | Japan . |
| 1147946 | 6/1989 | Japan . |
| 1264463 | 10/1989 | Japan . |
| 1265767 | 10/1989 | Japan . |
| 2126762 | 5/1990 | Japan . |
| 3064157 | 3/1991 | Japan . |
| 3145363 | 6/1991 | Japan . |

OTHER PUBLICATIONS

L. Spilman, "Customized Digital Network for the Department of Defense," 1986, pp. 60-65.
Watabe et al., "A Distributed Multiparty Desktop Conferencing System and Its Architecture," Mar. 1990, pp. 386-393.

*Primary Examiner*—Curtis Kuntz
*Assistant Examiner*—Stella L. Woo
*Attorney, Agent, or Firm*—Rothwell, Figg, Ernst & Kurz

[57] ABSTRACT

A multi-location conference system has conference terminals connected to a conference device, which stores information for the conferences. A reservation center registers and deletes conference information in and from the conference device at times designated in accordance with reserved conference information collected in advance for the respective conferences, thereby controlling automatically the starting and ending of each of the conferences. Where there are first conference terminals that can be connected with a selected one of line speeds, and second television terminals that can be connected with a fixed one of the line speeds, and a plurality of conference devices each capable of simultaneously holding multi-location conferences at a selected one of said plurality of line speeds are provided, an operational management device is provided to assign, at the time of convening or reserving a conference, the conference device by a sequential search in an order different dependent on the selected line speed.

9 Claims, 21 Drawing Sheets

FIG. 13A

| "1" | RESERVATION DECISION INFORMATION |
|---|---|

FIG. 13B

| "2" | RESERVATION ACCEPTED OR REJECTED | RESERVATION KEY CODE |
|---|---|---|

— "0" RESERVATION ACCEPTED
— "1" RESERVATION REJECTED

FIG. 13C

| "3" | RESERVATION KEY CODE | RESERVATION DETAIL INFORMATION |
|---|---|---|

MULTI-LOCATION TELEVISION CONFERENCE SYSTEM

The present invention relates to a multi-location television conference system to which a plurality of conference terminals are connected using a switching means, so that conferences can be conducted between the conference terminals.

FIG. 1 is a block diagram showing a conventional multi-location television conference system such as the one disclosed in, for example, Japanese Patent Kokai Publication No. H1-265767. The illustrated conference system comprises a plurality of conference terminals CT participating in multi-location television conferences, a ring network RN to which the conference terminals CT are connected, and a conference device CD connected to the ring network RN to hold the conferences.

The television conference is held using a multiple-address, simultaneous communication channel and an individual communication channel of a time-division multiplex channel as a communication path RN of ring network configuration. That is, in a television conference terminal CT, video and audio conference data are input by means of a video camera and a microphone, and are then placed by means of a transmitter onto the individual communication channel of the ring network RN for transmission to the conference device CD.

The conference device CD uses its receiver to receive conference data from the respective conference terminals CT via the individual communication channels of the ring network RN and synthesizes them at the conference data synthesizer. It then places the synthetic conference data through its transmitter onto the multiple-address communication channel of the ring network RN and sends it to all the conference terminals CT.

Each of the conference terminals CT, using its receiver, receives the conference data on the multiple-address channel of the ring network RN, and outputs them by means of an image display, such as a television monitor, and a loudspeaker.

When a switching device is used in place of the ring network RN, it is possible to effect multi-location conferences in a similar manner by connecting between the conference device CD and the switching device with a plurality of lines, thereby providing one-to-one connection between each conference terminal CT and the conference device CD via the switching device.

Because the conventional multi-location television conference systems are configured as described above, they are associated with a number of problems. First, their applicability is limited when they make use of a ring network RN within a specific corporation or an establishment, and they cannot, for example, be applied to multi-location conferences between widely separated locations, such as between distant cities. In addition, in a conventional multi-location television conference system implemented by means of an integrated services digital network (hereinafter abbreviated "ISDN"), the number of lines subscribed to connect the conference device CD with the ISDN must not be less than the maximum number of terminals participating in the conference. When multi-location conferences are held between a small number of conference terminals CT, there will be a considerable number of lines which are subscribed but are not actually used. Thus, the ratio of utility of the lines is low. Moreover, when each conference can be held with a selected one of a plurality of line speeds, e.g., $H_0$ (384 kbps) and 2 B (2×64 kbps), the utility of the conference devices may be low if no particular consideration is given since each conference device cannot communicate with the conference terminals at different line speeds simultaneously. That is, each conference device CD cannot communicate with the conference terminals at different line speeds simultaneously: when it communicates with a particular terminal at one of the line speeds (e.g., 2 B), it cannot simultaneously communicate with another conference terminal CT at another line speed (e.g., $H_0$). As a result, each conference device CD cannot hold conferences at different line speeds simultaneously: when it holds a conference at one of the line speeds, it cannot simultaneously hold another conference at another line speed. When for instance all the conference devices CD have been assigned to conferences at a certain line speed, no further conference cannot be held at a different line speed even if there are adequate vacant lines with which the conference terminals which are to participate in the contemplated conference can be connected to any of the conference devices CD.

SUMMARY OF THE INVENTION

An object of the present invention is to make it possible to automatically control starting and ending of such multi-location conferences in accordance with previously collected reserved conference information.

Another object of the present invention is to make it possible to hold a plurality of multi-location conferences simultaneously.

Another object of the invention is to improve the utility of the conference devices and the communication lines connecting the conference devices with the conference terminals.

A multi-location conference system in accordance with one aspect of the invention comprises:

a plurality of conference terminals performing input and output of conference data consisting of video and audio signals; and a conference device which is connected to said plurality of conference terminals and which holds conferences between said plurality of conference terminals by synthetic processing of conference data sent to it;

characterized in that:

said conference device is provided with a conference table storing information for the conference terminals participating in the conferences being held; and said system further comprises a reservation center for registering conference terminal information in said conference table and deleting the conference terminal information from the conference table at times designated in accordance with reserved conference information collected in advance for the respective conferences, thereby controlling automatically starting and ending of each of the conferences.

With the above configuration, the conference table manages the conference terminal information, and thus arranges for the holding of multi-location conferences in accordance with the reserved conference information previously registered in the reservation center, with the result that the starting and ending of these conferences are controlled automatically, and a plurality of multi-location conferences can be held simultaneously.

There may be further provided a reservation terminal connected to the reservation center via a communication line, and the reserved conference information may comprise a reservation decision information requisite for making the decision as to whether to accept or reject the reservation, and reservation detail information, and the reservation terminal sends the reservation decision information via a communication line to said reservation center, the reservation center, responsive to the reservation decision information, makes decision as to whether to accept or reject the reservation at said reservation center and sends the result of decision to said reservation terminal, and the reservation terminal sends, if the result of the decision is to accept the reservation, the reservation detail information to said reservation center, thereby to achieve the registration of the reserved conference information in the reservation center.

With the above configuration, the reservation detail information is sent only after the reservation is accepted. As a result, the overall amount of information that is exchanged for the reservation is reduced, allowing the use of low-speed components, e.g., a low-speed modem.

A multi-location television conference system according to another aspect of the invention comprises:

a plurality of first television conference terminals that can be connected to a communication network with a first line speed;

a plurality of second television conference terminals that can be connected to said communications network with a second line speed;

a plurality of conference devices which are connected by a plurality of lines to said communication network, and which are capable of simultaneously holding multi-location conference at a selected one of said first and second line speeds; and an operational management device to which said conference devices are connected, which determines, at the time of convening a multi-location conference, the conference device which is to hold the conference by searching for the conference device which can hold the conference with the line speed with which the television conference terminals participating in the conference can be connected, and the line speed and the number of vacant lines of each of the conference devices, in an order different depending on the specific line speed, and which controls starting and ending of the conference.

A multi-location television conference system according a further aspect of the invention comprises:

a plurality of first television conference terminals that can be connected to a communication network with a first line speed;

a plurality of second television conference terminals that can be connected to said communications network at a second line speed;

a plurality of conference devices which are connected by a plurality of lines to said communication network, and which are capable of simultaneously holding multi-location conferences with a selected one of said first and second line speeds; and an operational management device to which said conference devices are connected, which has a reservation file capable of storing reserved conference information including starting time and ending time of each of the multi-location conferences and a clock by which it is possible to indicate the current time, which reserves a conference device, and which controls starting and ending the conference;

wherein, at the time of reserving a multi-location conference, said operational management device determines, in accordance the number of the conference terminals which are to participate in the conference, as well as the line speed with which the reservation has been made for each conference device, and the number of vacant lines of each conference device, the conference device which is to be reserved for the conference by searching for the conference device which can hold the conference with the line speed with which the television conference terminals which are to participate in the conference can be connected, wherein said search is made in an order different dependent on the specific line speed.

With the above configuration, it is possible to realize a conference device with which the vacant lines of the conference system can be efficiently utilized.

BRIEF DESCRIPTION OF THE DRAWINGS

FIG. 13A to FIG. 13C are diagrams showing various pieces of information sent and received between the reservation center and the reservation terminal in the embodiment of FIG. 9.

DETAILED DESCRIPTION OF THE PREFERRED EMBODIMENTS

First Embodiment

Figure 2:
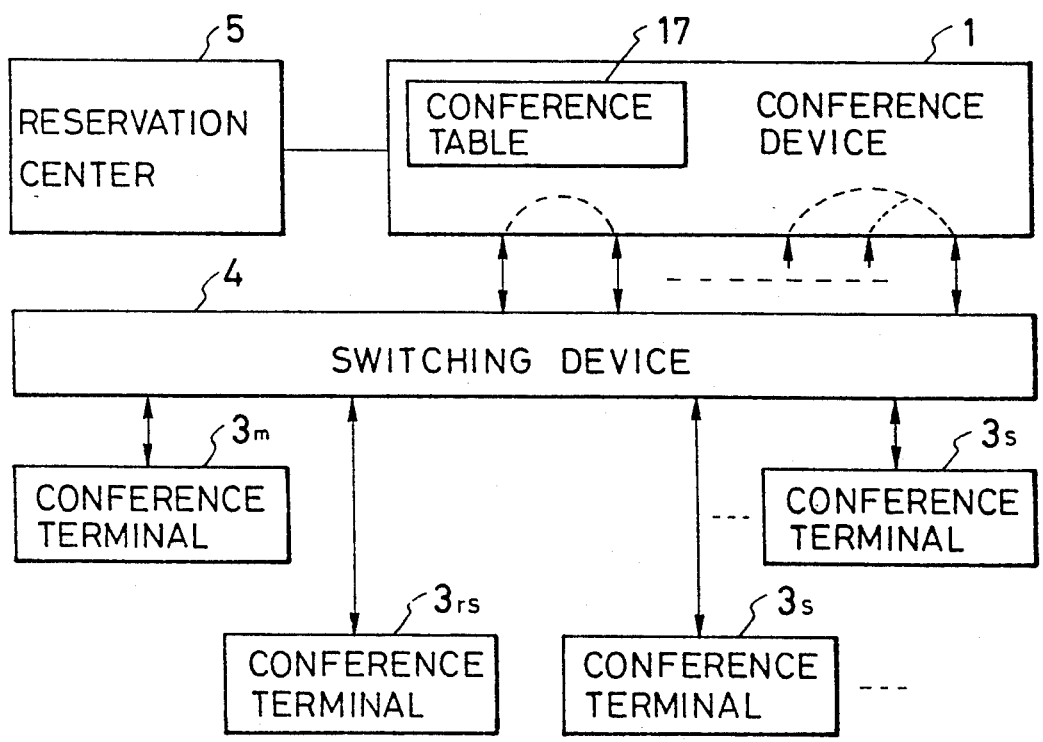
FIG. 2 is a block diagram showing the configuration of a multi-location conference system in accordance with an embodiment of the invention.

FIG. 2 is a block diagram showing the configuration of a multi-location conference system in accordance with a first embodiment of the invention. The illustrated conference system comprises a conference device 1, television conference terminals 3 connected to the conference device 1 via a switching device, such as an ISDN 4, and a reservation center 5 connected to the conference device 1.

Figure 1:
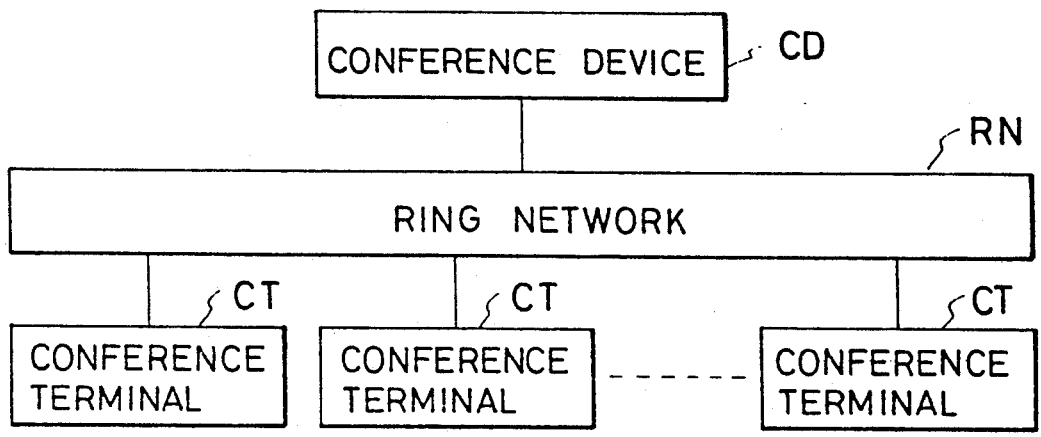
FIG. 1 is a block diagram showing the configuration of a conventional multi-location conference system.

The functions of the conference device 1 and the conference terminals 3 are basically identical to those of the conference device CD and the conference terminals CT in FIG. 1. The switching device 4 is used in place of the ring network RN in FIG. 1, and provides corresponding functions. One of the terminals 3 is designated a master terminal 3m, and other terminals are designated subordinate terminals 3s, one of which is designated a representative terminal 3rs. In the illustrated embodiment, it is assumed that the terminals 3 are operated by the personnel of various departments of a corporation at distant geographical locations. It is convenient if they are situated at or near the offices of the respective departments, and the master terminal 3m is disposed, e.g., at or near the office of the president of the corporation. The reservation center 5 is manipulated by the personnel of the department of the corporation in charge of the management of the conference system, and may be disposed at or near the office of such department. The conference device 1 on the other hand need not be manipulated during conference or reservation of the conference, and as it requires a considerable space for installment, it may conveniently be situated at a location relatively remote from the offices, e.g., in the exchanger room of the office building. In the illustrated embodiment, the conference device 1 and the reservation center 5 are assumed to be situated in the same office building or same premise, and the switching device 4 is not used for interconnecting the conference device 1 and the reservation center 5.

Figure 3:
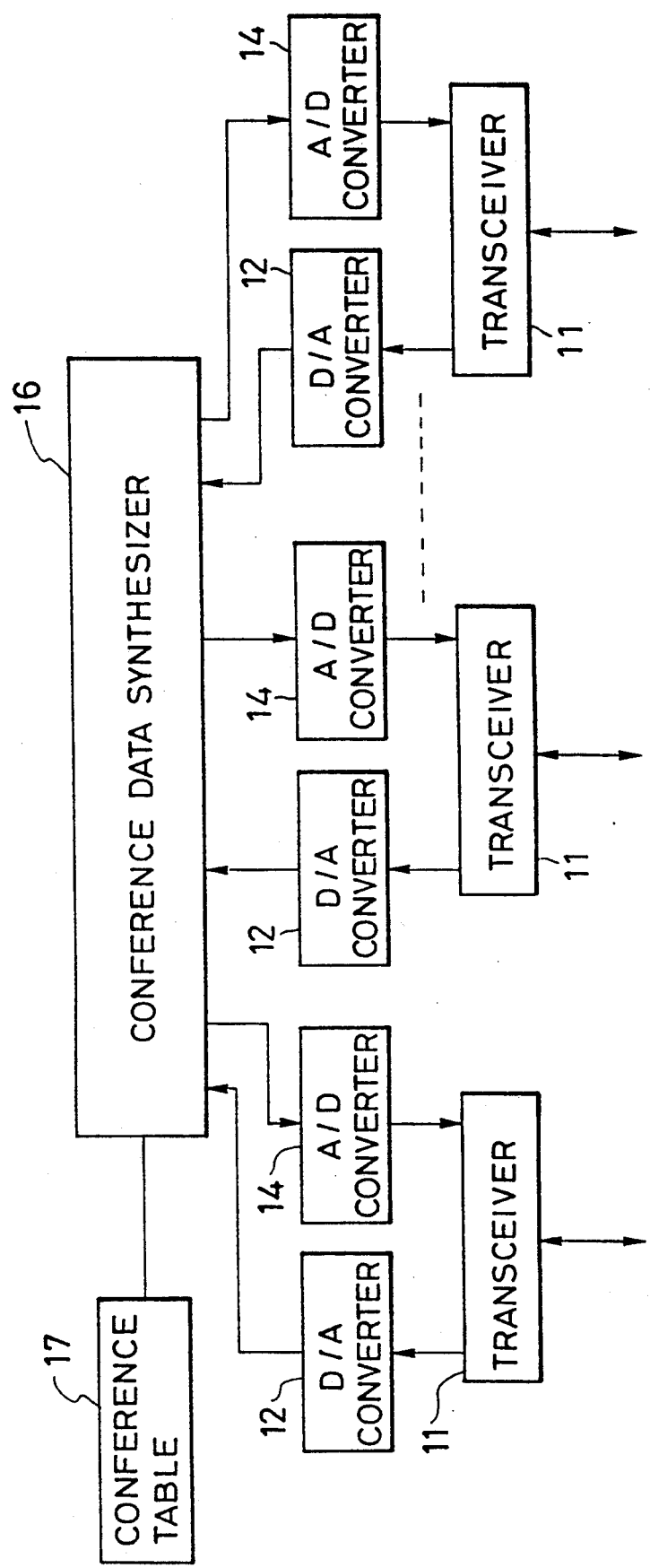
FIG. 3 is a block diagram showing the configuration of a conference device used in the embodiment of FIG. 2.

The configuration of the conference device 1 is shown in FIG. 3. As illustrated, the conference device 1 comprises transceivers 11 which are provided for each of the lines connected to the switching device 4. The transceivers 11 are connected via the switching device 4 to the conference terminals 3, and temporarily store data sent from the connected conference terminals 3. Digital-to-analog (D/A) converters 12 and analog-to-digital (A/D) converters 14 are connected to the respective transceivers 11. The D/A converters 12 convert the conference data received and stored at the corresponding transceiver 11, into an analog signal.

A conference data synthesizer 16 performs synthetic processing on the conference data received from the D/A converters 12. The synthetic processing includes selective mixing (superimposition) of audio signals and selection of video signals. That is, for each intended terminal (master terminal or a subordinate terminal) participating in a conference, the audio data sent from all the terminals participating in the same conference except the terminal in question are mixed and sent to the terminal in question. For the master terminal in a conference, the video signals from the representative terminal in the same conference is selected and sent to the master terminal. For each of the subordinate terminals in a conference, the video signals from the master terminal is normally selected and sent to each of the subordinate terminals in the same conference. When one of the subordinate terminals is making a speech, the video signals from this subordinate terminal may be selected and sent to other subordinate terminals and to the master terminal.

The conference data synthesizer 16 performs the synthetic processing by referring to conference terminal information stored in a conference table 17. This means that the conference table 17 stores the information determining the specific manner of synthesis, i.e., selection of the video signals and selective mixing of the audio signals. The contents of the conference table 17 can be altered by manipulation of an input means (not shown) at the master terminal 3m. That is, the selection of the video signals and the selective mixing of the audio signals can be altered by manipulation of the input means at the master terminal 3m.

Figure 3A:
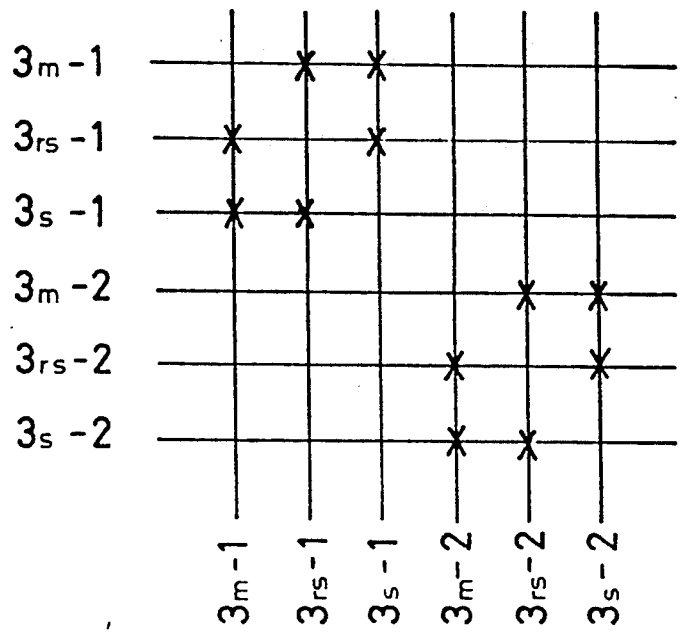
FIG. 3A and FIG. 3B are diagrams showing an example of the conference data synthesizer in FIG. 3.
Figure 3B:
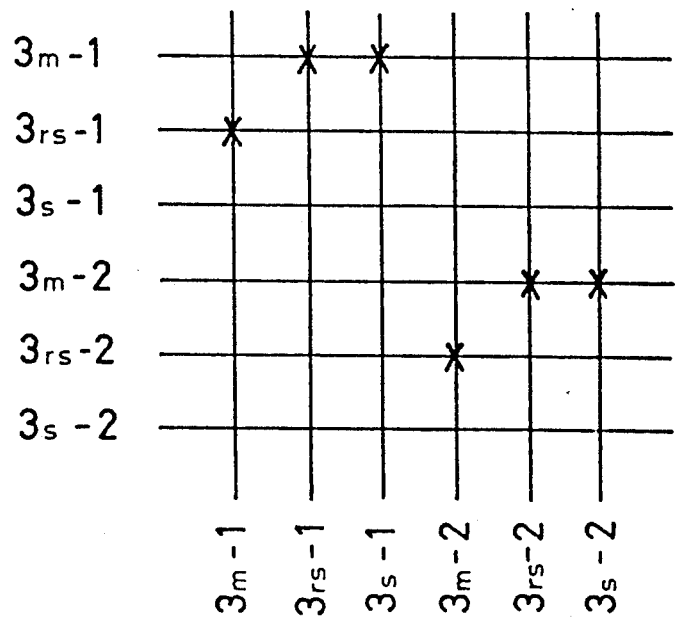

The conference data synthesizer 16 can perform synthetic processing for a plurality of conferences concurrently. FIG. 3A and FIG. 3B are schematic illustrations of an example of the conference data synthesizer 16. FIG. 3A shows the part of the synthesizer 16 relating to the audio signals, and FIG. 3B shows the part of the synthesizer 16 relating to the video signals. In FIG. 3A and FIG. 3B, it is assumed two conferences are held simultaneously, and conference denoted by 3m-1, 3rs-1 and 3s-1 are participating in one of the conferences, and conference terminals denoted by 3m-2, 3rs-1 and 3s are participating in another conference. The horizontal lines are connected to the D/A converters 12 for the respective terminals 3m-1, 3rs-1, 3s-1, 3m-2, 3rs-2 and 3s-2, and the vertical lines are connected to the A/D converters for the respective terminals 3m-1, 3sr-1, 3s-1, 3m-2, 3rs-1 and 3s-2. In FIG. 3A and FIG. 3B, the marks "x" at the intersections between horizontal and vertical lines indicate that the intersecting lines are connected with each other. In FIG. 3A, the signal appearing on a vertical line results from mixing the signals from the horizontal lines with which the vertical line is connected. In FIG. 3B, the signal appearing on a vertical line results from selection of the signal from the horizontal line with which the vertical line is connected.

The A/D converters 14 convert the analog signals that have been produced from the synthesizer 16, and output the digital signals. The transceivers 3 receive the digital data from the respective A/D converters 14 and send them to the conference terminals to which they are connected.

The conference data synthesizer 16 is connected to the conference table 17.

Figure 6:
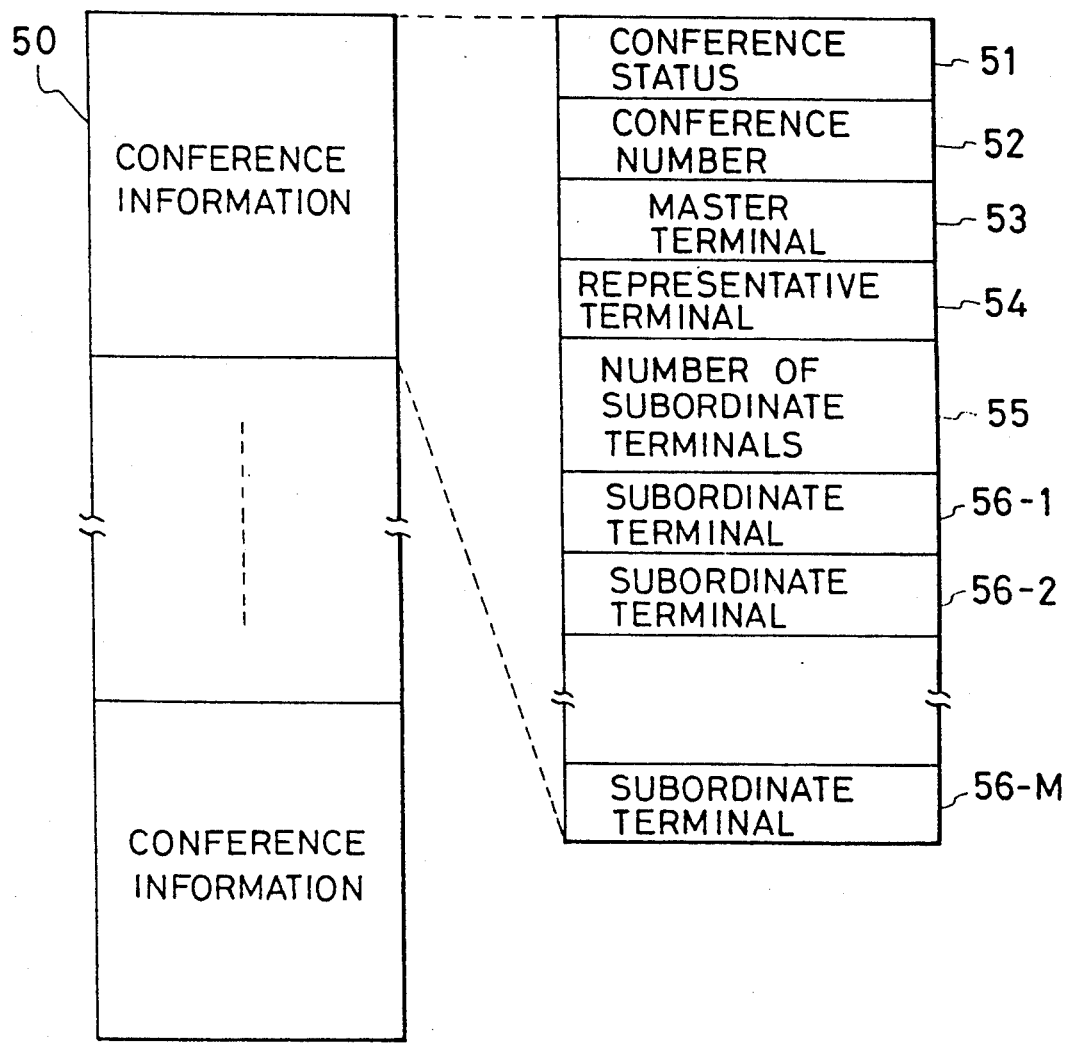
FIG. 6 is a block diagram showing the configuration of an example of a conference table used in the embodiment of FIG. 2.

The conference table 17 is configured as shown in FIG. 6, and stores conference information 50 on each of the conferences being held by the conference device. Conference information 50 for each conference consists of a conference status field 51 which indicates whether there is a conference in progress ("1") or not ("0"); a conference number field 52, consisting, for example, of a 4-bit numeral (no duplication permitted); a master terminal field 53 indicating the conference terminal 3 acting as the conference host; a representative terminal field 54 indicating one of the subordinate terminals which acts as the representative; a subordinate terminal number field 55 indicating the number of conference terminals 3 other than the conference host (master terminal); and subordinate terminal fields 56-1 to 56-M identifying the respective subordinate terminals 3s participating in the conference. The information identifying each subordinate terminal may consist of the telephone number.

Figure 4:
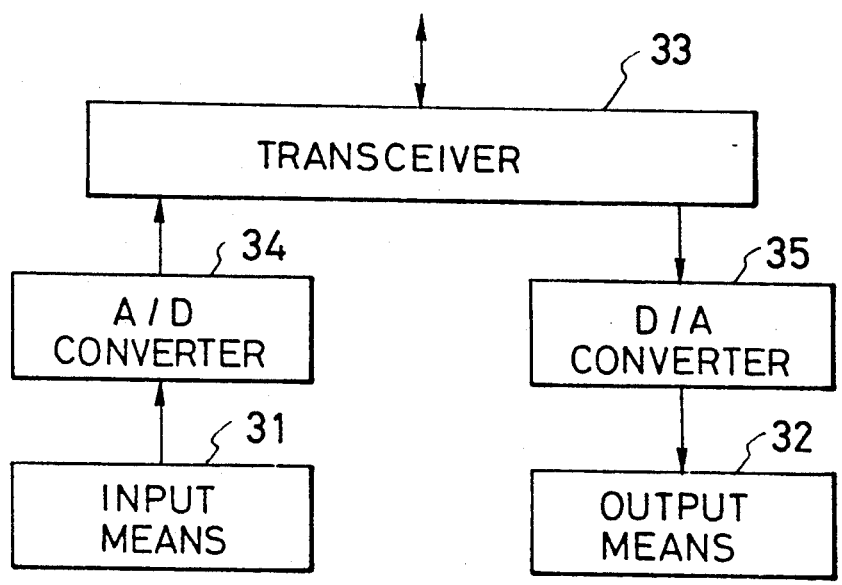
FIG. 4 is a block diagram showing the configuration of an example of a conference terminal used in the embodiment of FIG. 2.

The configuration of each of the conference terminals 3 is shown in FIG. 4. As illustrated, it comprises a conference data input means 31, such as, for example, a microphone, video camera or the like, for inputting audio and video data, and a conference data output means 32, such as, for example, a loudspeaker, television monitor or the like, for outputting audio and video data (the synthetic conference data resulting from the synthetic processing carried out at the conference device 1. The conference terminal 3 further includes a terminal transceiver 33 with the functions of receiving and temporarily storing the data from the switching device 4 and of sending the temporarily stored data, an A/D converter 34 for converting the conference data (analog signals) input from the conference data input means 31 into digital signals capable of being sent, and a D/A converter 35 for converting the synthetic conference data (digital signals) received by the terminal transceiver 33 into analog signals.

Figure 5:
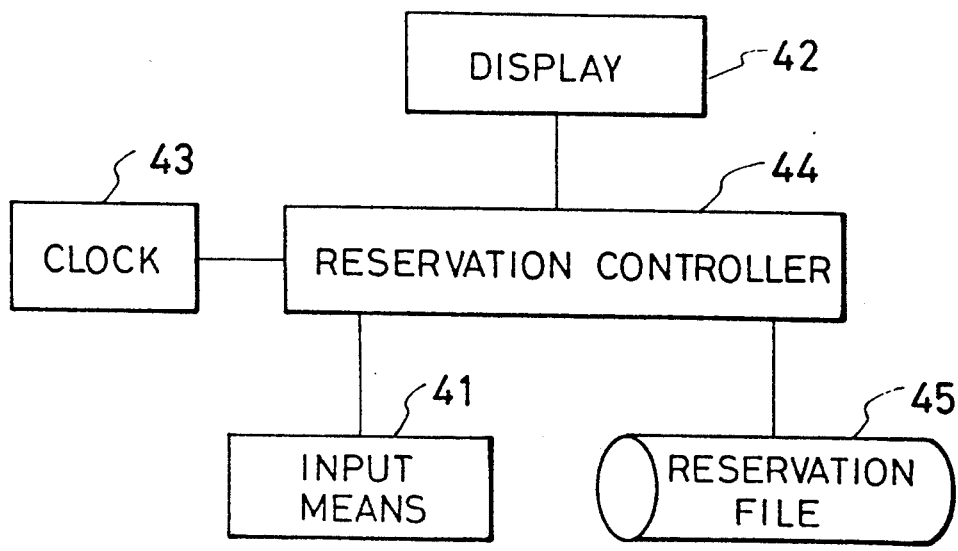
FIG. 5 is a block diagram showing the configuration of an example of a reservation center used in the embodiment of FIG. 2.

The reservation center 5 performs automatic control of starting and ending of multi-location conferences carried out by the conference device 1. As illustrated in FIG. 5, the reservation center 5 comprises an input means 41, such as, for example, a keyboard or the like, for the inputting of reserved conference information, a display means 42, such as, for example, a television monitor or the like, by which the operator is informed of the reserved conference information and of the operational status of multi-location conferences being held by the conference device 1 to which it is associated. A clock 43 provides information on the time, i.e., the year, month, day, hour, minute and second. A conference reservation control means 44 provides for new registration, modification and deletion of the reserved conference information, and indicates, when the time comes for the starting or ending of the reserved conference information, the starting or ending of the respective conferences. A reservation file 45 is in the form of a storage medium such as, for example, a hard disk, which stores the reserved conference information input as above described.

Figure 7:
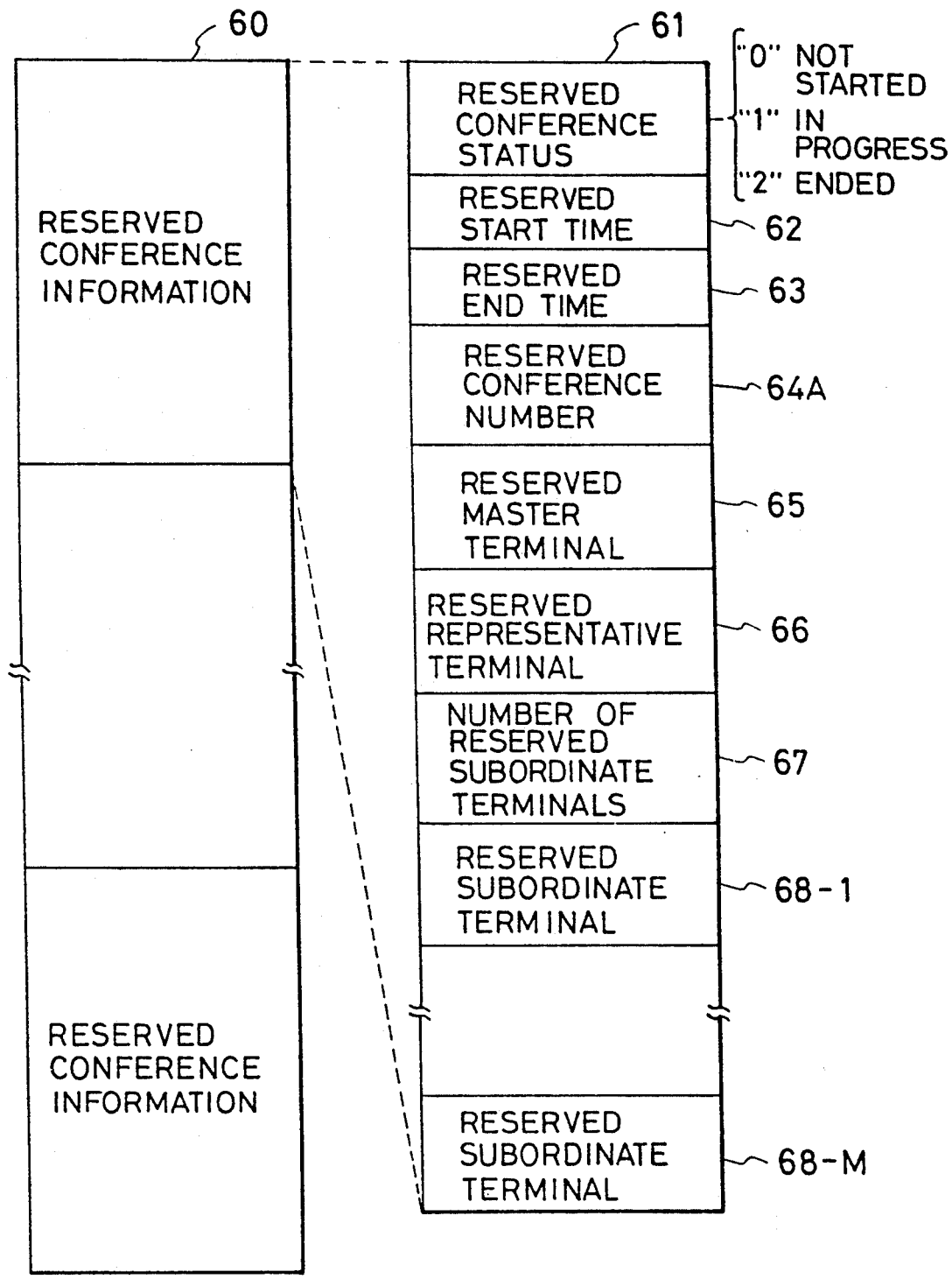
FIG. 7 is a block diagram showing the configuration of an example of a reservation file at the reservation center used in the embodiment of FIG. 2.

The reservation file 45 is composed of a plurality of blocks of reserved conference information 60 as shown in FIG. 7, and each block of the reserved conference information 60 is comprised of a field for the reserved conference status 61, which is at "0" if the conference has not been started, at "1" if it is in progress and at "2" if it has ended. The reservation file 45 also includes a field 62 for the reserved start time indicating the time a reserved conference starts, a field 63 for the reserved end time indicating the time a reserved conference ends, a field 64A for the reserved conference number consisting, for example, of four bits (no duplication permitted), a field 65 for the reserved master terminal which acts as the host of the reserved conference, a field 66 for the reserved representative terminal 66 which is one of the reserved subordinate terminals designated to act as the representative, a field 67 indicating the number of reserved subordinate terminals, and fields 68-1 to 68-M for identifying the respective reserved subordinate terminals which participate in the reserved conference.

Figure 8:
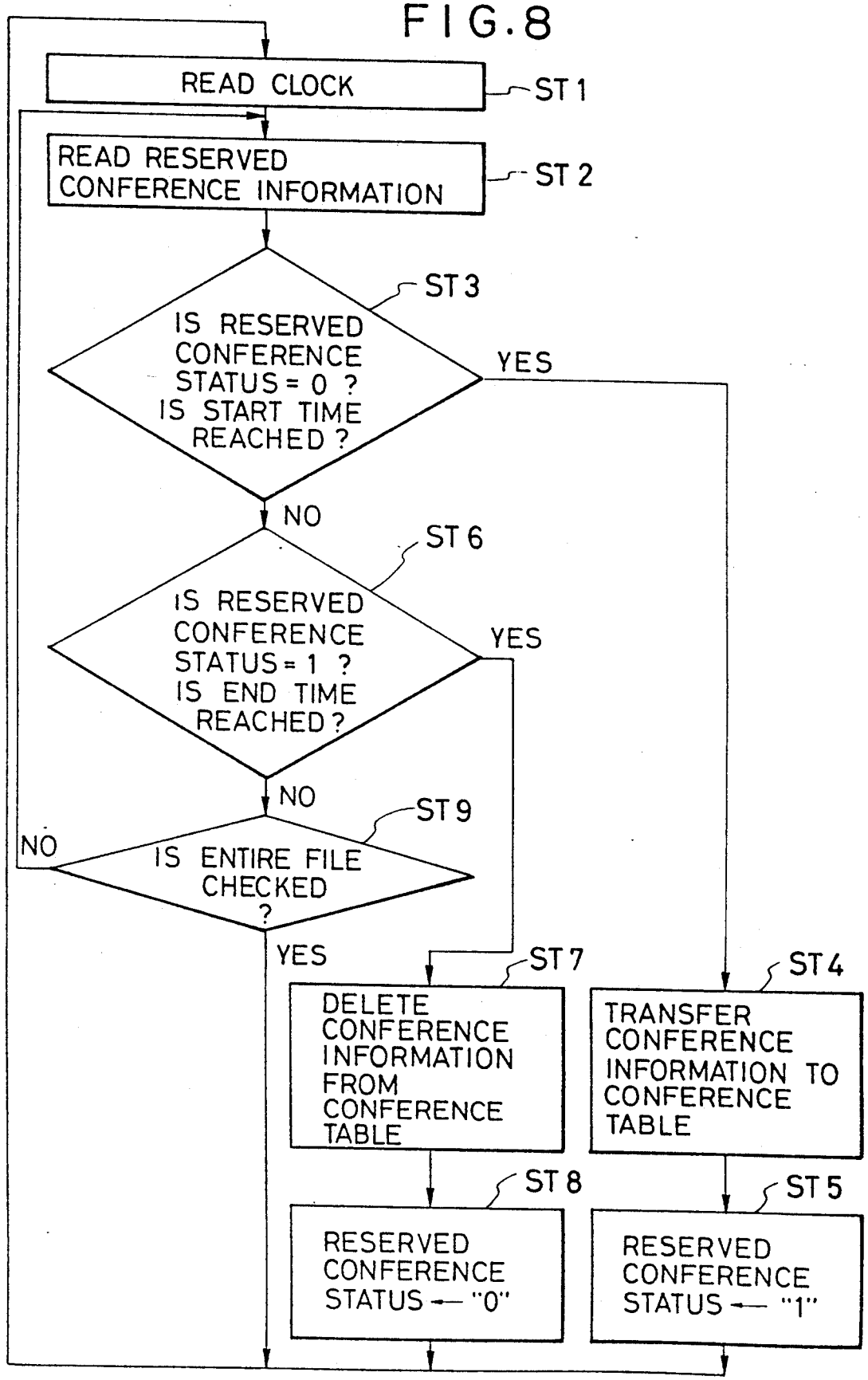
FIG. 8 is a flow chart for explaining the operation of the embodiment of FIG. 2.

The operation of the conference system will now be described with reference to FIG. 8. At step ST1, the conference reservation control means 44 first reads information on the year, month, date, hour, minute and second from the clock 43, and then, at (at step ST2) reads sequentially, in descending order (from the head to the tail), from the reservation file 45, the reserved conference information for which the reserved conference status field 61 contains a value other than "2". Then (step ST3), the reserved start time 62 in the field for the reserved conference information 60 of which the reserved conference status field 61 contains "0" is compared with the current time information read from the clock 43 in step ST1.

When the current time and the reserved start time are found to match, the contents of the field for the reserved conference information 60 in the reservation file 45 of the reservation center 5 are transferred (copied) to the area for the conference terminal information 50 in the conference table 17 of the conference device 1 of which the conference status field 51 contains "0" (step ST4), and the reserved conference status field 61 of that reserved conference information 60 is set to "1" (step ST5).

The transferring operation above described consists of transferring and storing the content of the reserved conference number 64A to the field 52 for the conference number in the conference information 50, the content of the reserved master terminal 65 to the field 53 for the master terminal, the content of the reserved representative terminal 66 to the field 54 for the representative terminal, the content of the number of reserved the subordinate terminals 67 to the field 55 for the number of the subordinate terminals, and the contents of the reserved subordinate terminals 68-1 to 68-M to the fields 56-1 to 56-M for the subordinate terminals, thereby enabling the conference information synthesizer 16 to hold a plurality of conferences simultaneously in accordance with the conference table 17.

Next, a comparison is made (step ST6) between, on one hand, the reserved end time 63 of the reserved conference information 60 of which the reserved conference status 61 is "1" and, on the other, the current time information read from the clock 43 in step ST1, and if the current time and the reserved end time are found to match, the corresponding conference information 50 is deleted from the conference table 17, i.e., the conference status 51 is reset to "0" (Step ST7), the reserved conference status 61 in the reserved conference information 60 described above is set to "2" (step ST8). The above operations are performed throughout the entire file (step ST9).

In the embodiment above described, the explanation was made on the assumption that the switching device 4 such as an ISDN was used as the switching means connecting the conference terminals 3 and the conference device 1 and transferring data between them. But similar results may be achieved by the use of a ring network.

As has been above described, in accordance with the first embodiment, it is possible to conduct a plurality of multi-location conferences simultaneously and to effect automatic control of the starting and ending of each of the conferences, by providing in a conference device a conference table that manages conference information and execution and management of multi-location television conferences are made in accordance with reserved conference information registered in the reservation center.

Second Embodiment

A second embodiment of the invention will now be described with reference to FIG. 9, in which parts that are identical with or corresponding to those of the multi-location conference system of FIG. 2 to FIG. 7 are identified with the same reference numerals, and their description is omitted.

Figure 9:
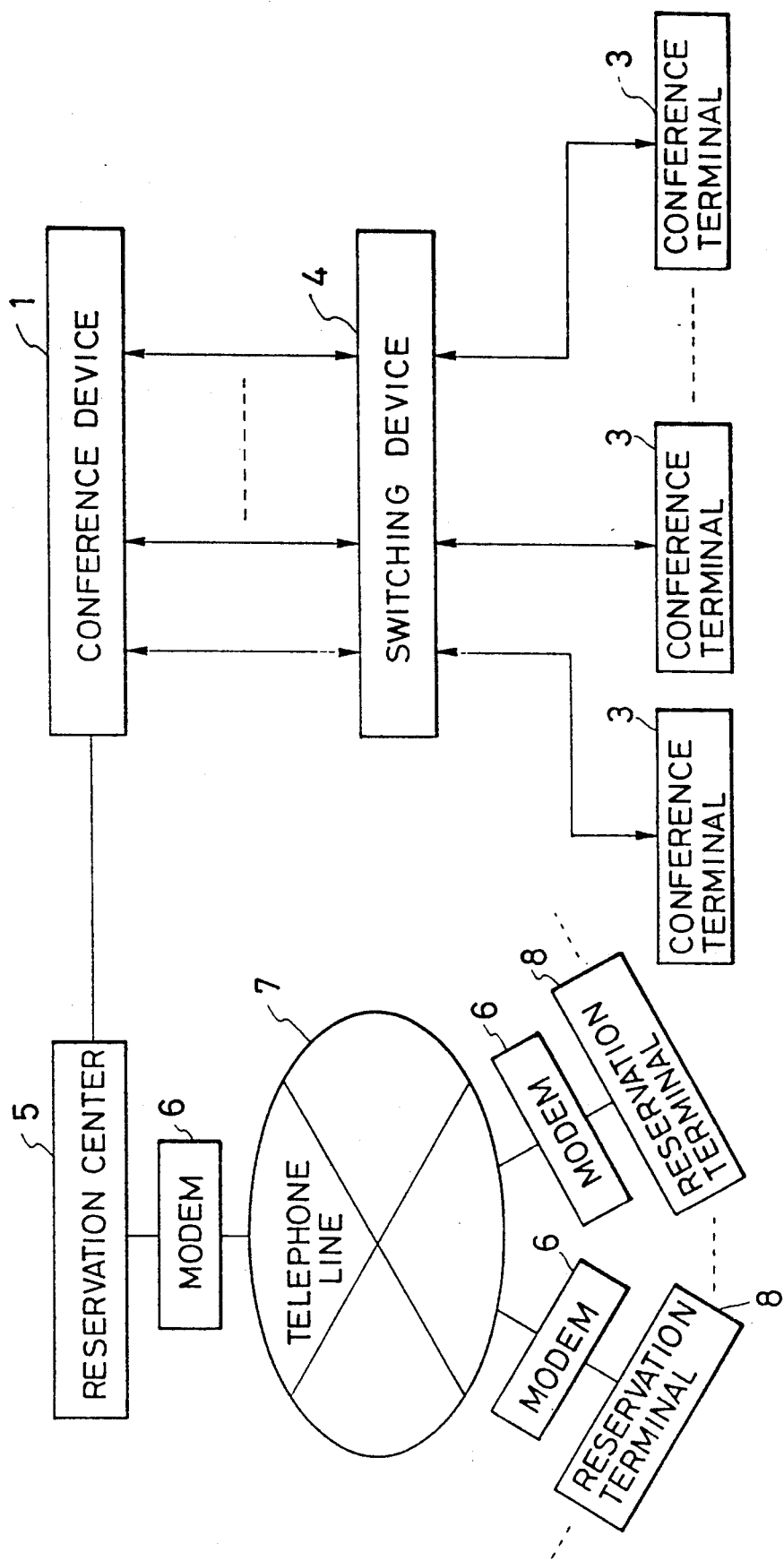
FIG. 9 is a block diagram showing the configuration of a multi-location conference system of another embodiment of the invention.

As illustrated in FIG. 9, the reservation center 5 of this embodiment is connected via a communication line such as a telephone line 7 to reservation terminals 8. For connection of the reservation center 5 with the telephone line 7, modems 6 are inserted. The reservation terminals 8 are used for sending reserved conference information from remote locations to the reservation center 5. The reservation terminals 8 may be in the same premises or same office building as the conference terminals 3, and may be disposed adjacent to the conference terminals 3.

Figure 10:
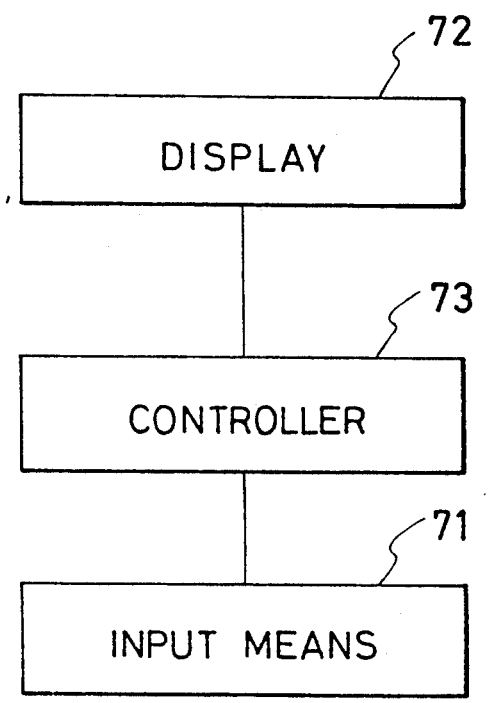
FIG. 10 is a block diagram showing the configuration of an example of a reservation terminal used in the embodiment of FIG. 9.

The configuration of each reservation terminal 8 is shown in FIG. 10. As illustrated, it comprises a reservation terminal input means 71 such as a keyboard or the like for inputting the reserved conference information 60, a reservation terminal display means 72 such as a television monitor or the like for displaying information concerning operation for registration in the reservation center 5, and a reservation terminal control means 73 for the new registration, modification or deletion of the reserved conference information 60.

Figure 11:
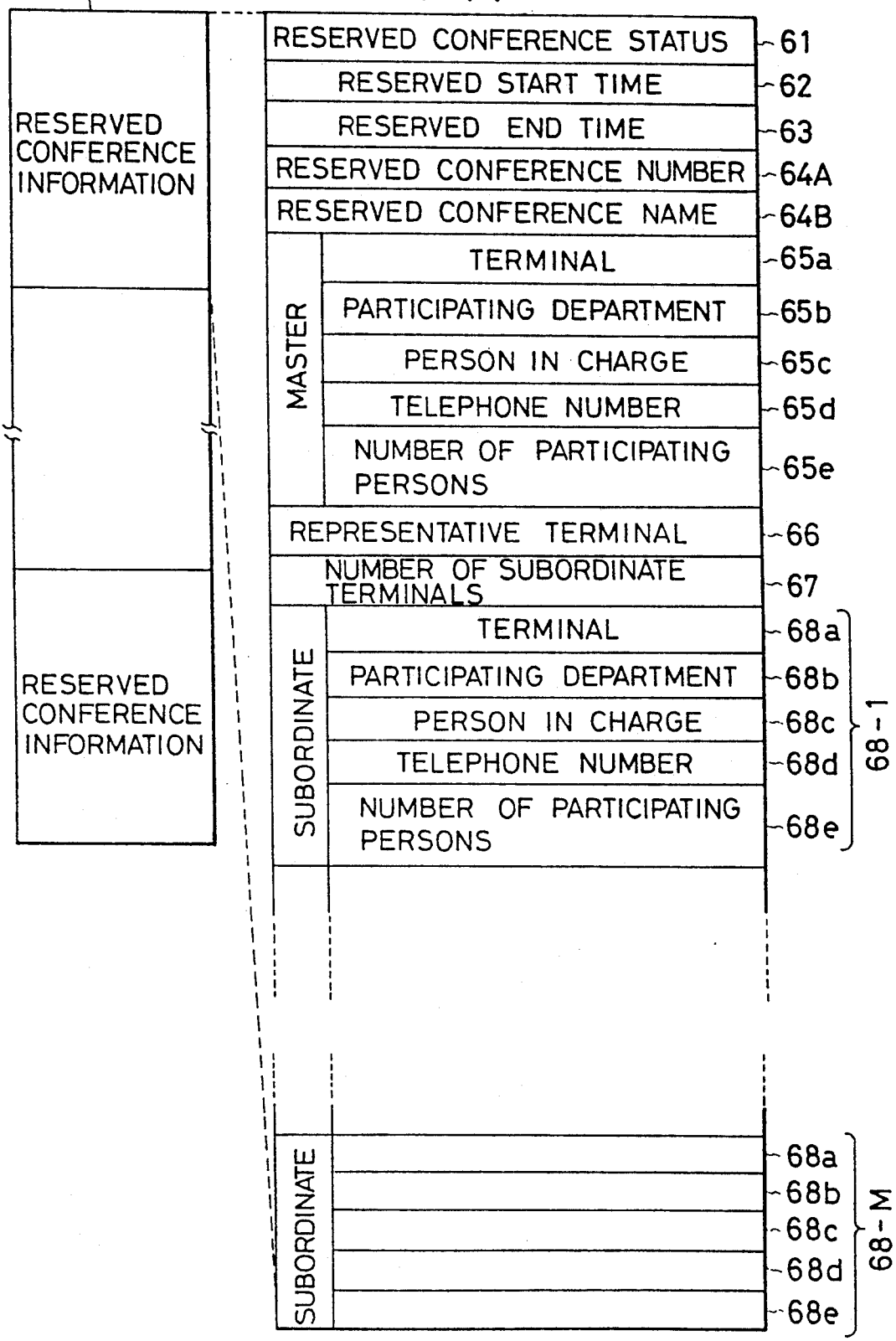
FIG. 11 is a block diagram showing the configuration of an example of a reservation file at the reservation center used in the embodiment of FIG. 9.

The configuration of the reservation file 45 at the reservation center 5 of this embodiment is shown in FIG. 11, in which parts that are identical with or corresponding to those parts in the reservation file 45 of the first embodiment of FIG. 2 to FIG. 8 are identified with the same reference numerals, and their description is omitted. As illustrated in FIG. 11, the reservation file 45 includes a field 64B for indicating the conference name consisting, for example, of 20 characters in "kanji" (Chinese characters) and/or alphanumeric code, a field 65a for identifying the terminal, a field 65b for identifying the participating department at the master terminal, consisting of 6 alphanumeric characters, a field 65c for identifying the person in charge at the master terminal, consisting of 10 characters in "kanji" and/or alphanumeric code, a field 65d for indicating the telephone number of the master terminal, consisting of 20 numeric characters, a field 65e for the indicating the number of participating persons at the master terminal, consisting of 2 numeric characters, and fields 68-1 to 68-M for the respective subordinate terminals.

Each of the fields 68-1 to 68-N comprises a field 68a for identifying the terminal, a filed 68b for identifying the participating department at the subordinate terminal consisting of 6 alphanumeric characters, a field 68c for identifying the person in charge at the subordinate terminal, consisting of 10 characters in "kanji" and/or alphanumeric code, a field 68d for indicating the telephone number of the subordinate terminal, consisting of 20 numeric characters, and a field 68e for indicating the number of participating persons at the subordinate terminal, consisting of 2 numeric characters.

Figure 12:
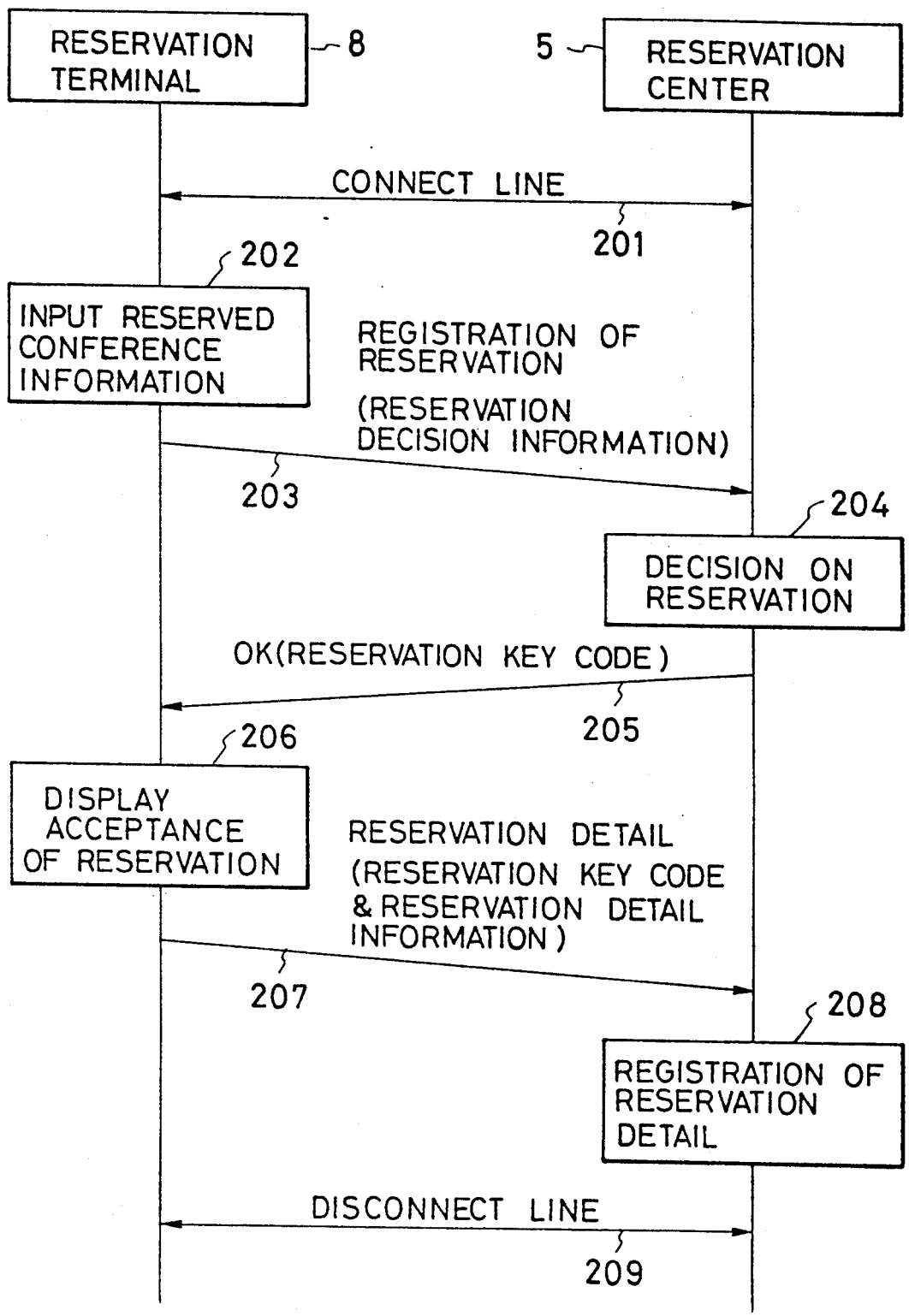
FIG. 12 is a processing sequence for explaining the registration of the reserved conference information in the embodiment of FIG. 9.

The procedure for the registration of a reserved conference information at the reservation center, is shown in FIG. 12.

The operations of the system other than the registration procedure are similar to those of the first embodiment, and their description is omitted. The operations for the registration of this embodiment differ from those of the First Embodiment in that the reservation information is divided into reservation decision information and reservation detail information, and the reservation information is first sent from one of the reservation terminals 8 to the reservation center 5, a decision is made at the reservation center 5 as to whether to accept or reject the reservation, the result of the decision is sent from the reservation center 5 to the reservation terminal 8, and, if the result of the decision indicates that the reservation is accepted, the reservation detail information is then sent from the reservation terminal 8 to the reservation center 5.

For example, the reservation decision information comprise information in the fields 62, 63, 65a, 66, 67 and 68a in FIG. 11, and the reservation detail information comprise the information in the remaining fields in FIG. 11.

The above-outlined operations are next described in further detail.

Once a one-to-one connection has been established between the reservation center 5 and one of the reservation terminals 8, via the modem 6 and the telephone line 7 (201), items of reservation conference information 60 are input using the reservation terminal input means 71 (202).

At this time, reservation center 5 is in the standby state, ready to receive a command from the reservation terminal 8.

Once all the items have been input to it, the reservation terminal 8 sends information of a transmission pattern shown in FIG. 13A to the reservation center 5, for registering the reservation (203). On the basis of the reservation decision information of the transmission pattern that has been received (see FIG. 13A), the reservation center 5 makes a decision by referring to the reservation file 45 as to the status of the conference terminals 3 and the conference devices 1, and if the reservation can be accepted, a reservation number is assigned and written in the reserved conference number field 64A and a reservation key code is created (204), and information of a transmission pattern shown in FIG. 13B is then returned to the reservation terminal 8 (205).

When it receives this return pattern of FIG. 13B, the reservation terminal 8 notifies the operator by display (206) appearing on the reservation terminal display means 72 as to whether the reservation request has been accepted or not, and if the reservation has been accepted, sends to the reservation center 5 the reservation detail information previously input, along with the key code received in a transmission pattern shown in FIG. 13C (207). When the reservation detail information is received at the reservation center 5 the information is registered as the reserved conference information 60, in the reservation file 45 (208). When this registration is completed, the communication line between reservation terminal 8 and reservation center 5 is disconnected (209).

As an example, the time required for sending the reservation decision information is about 1 to 2 seconds, and the time require for sending the reservation detail information is on the order of 10 seconds.

In the Second Embodiment above described, the telephone line 7 was used as a communication line connecting the reservation center 5 and the reservation terminals 8, a similar effect can be achieved by the use of a dedicated line or private communication line.

In the Second Embodiment above described, a plurality of reservation terminals 8 are provided. But, there may be only one reservation terminal 8.

In accordance with the Second Embodiment, when it is desired that the registration of the reserved conference information at the reservation center be carried out at reservation terminals connected via communication lines, the reservation decision information required for the decision as to whether to accept or reject the reservation is sent first, and a decision as to acceptance or rejection of the reservation made, and the reservation detail information is thereafter sent from the reservation terminal to the reservation center only after the reservation is accepted. An advantage is that the decision can be made in shorter times, and transmission equipment, such as modems, with lower transmission speed can be used.

Third Embodiment

Figure 14:
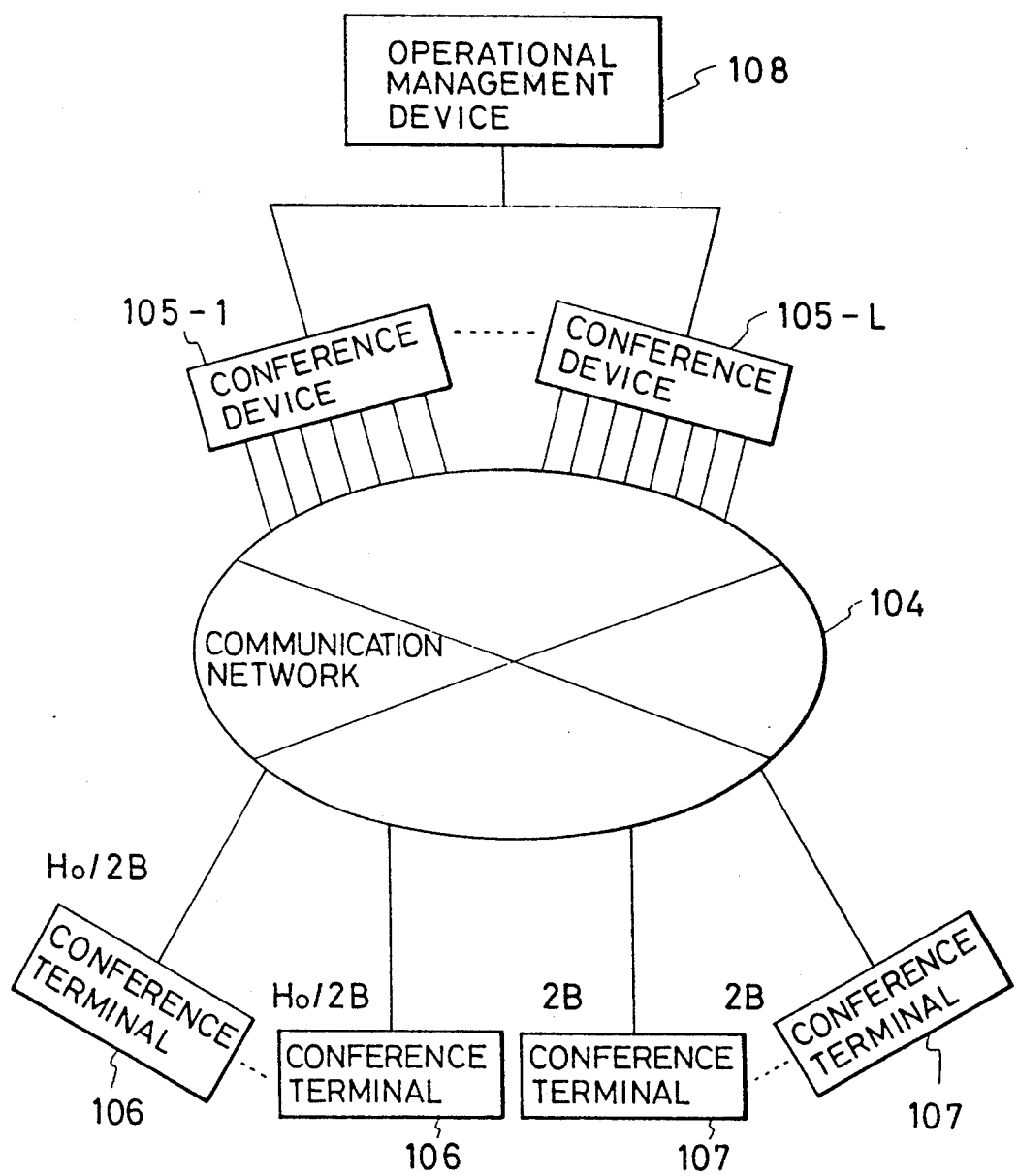
FIG. 14 is a schematic diagram showing a multi-location television conference system of another embodiment of the invention.

A third embodiment of the invention will now be described with reference to FIG. 14. As in the First and Second Embodiments, an ISDN 104 is used as the communication line. The ISDN 104 may have D channels, B channels and $H_0$ channels, and permits transfer of data at a selected one of line speeds of 2B and $H_0$. A plurality of conference devices 105 are connected to the ISDN 104 by a plurality of lines. Each of the conference devices 105 can hold multi-location conferences with a line speed of either 2B or $H_0$. Each conference device 105 however cannot communicate with the conference terminals at different line speeds simultaneously: when it communicates with one of the line speeds (e.g., 2B), it cannot simultaneously communicate with another conference terminal at a different line speed (e.g., $H_0$). As a result, the conference must be conducted at a line speed at which the conference terminal having the lowest line speed capability can communicate with. Another consequence is that each conference device 105 cannot hold conferences at different line speeds simultaneously: when it holds a conference at one of the line speeds, it cannot simultaneously hold another conference at a different line speed. When for instance all the conference devices 105 have been assigned to conferences at a certain line speed, another conference cannot be held at a different line speed even if there are adequate vacant lines with which the conference terminals which are to participate in the contemplated conference can be connected to any of the conference device 105. The present embodiment has been conceived to overcome this problem. It relates to the manner of assignment of conference devices which maximizes the utility of the conference devices.

A plurality of television conference terminals 106 and 107 are connected to the ISDN 104. The television conference terminals 106 can be connected to the ISDN 104 designating a line speed of either 2B or $H_0$, while the television conference terminals 107 can be connected to the ISDN 104 only at a line speed of 2B. An operational management device 108 is connected to the conference devices 105 and controls starting and ending of multi-location conferences.

The configuration of the conference device 105 may be similar to the conference device 1 shown in FIG. 3. But the transceiver 11 is capable of specifying the line speed as either 2B or $H_0$.

Figure 15:
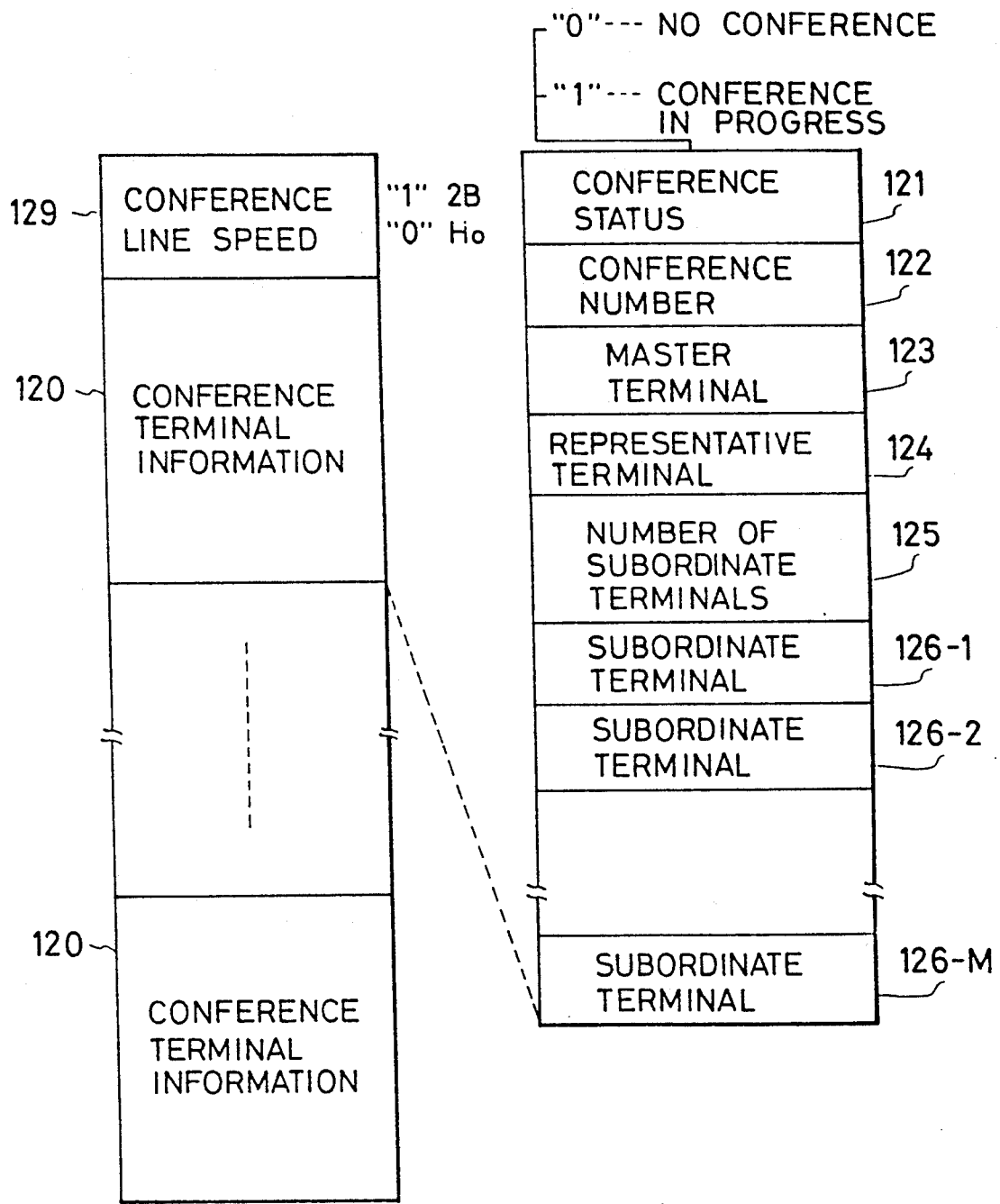
FIG. 15 is an explanatory drawing showing the configuration of an example of a conference table used in the embodiment of FIG. 14.

The conference table 115, shown in FIG. 15, used in the conference device in this embodiment is similar to the conference table 17 of FIG. 3, but is also provided with a field 129 for indicating the line speed, in addition to the blocks of conference information 120. Each block of conference information 120 is shown on the right half of FIG. 16. Fields 121, 122, 123, 124, 125 and 126-1 to 126-M respectively correspond to the fields 51, 52, 53, 54, 55 and 56-1 to 56-M in FIG. 6. The line speed field 129 indicates the line speed for the multi-location conference to be held on the conference device 105 and containing a value "1" to indicate 2B and a value "2" to indicate $H_0$.

The configuration of each of the television conference terminals 106 and 107 may be similar to that of the television conference terminal 3 in FIG. 4. However, the terminal transceiver 33 in the television conference terminals 106 or 107 in this embodiment has the additional functions of determining, when connecting to the ISDN 104, whether the line speed is to be 2B or $H_0$.

Figure 16:
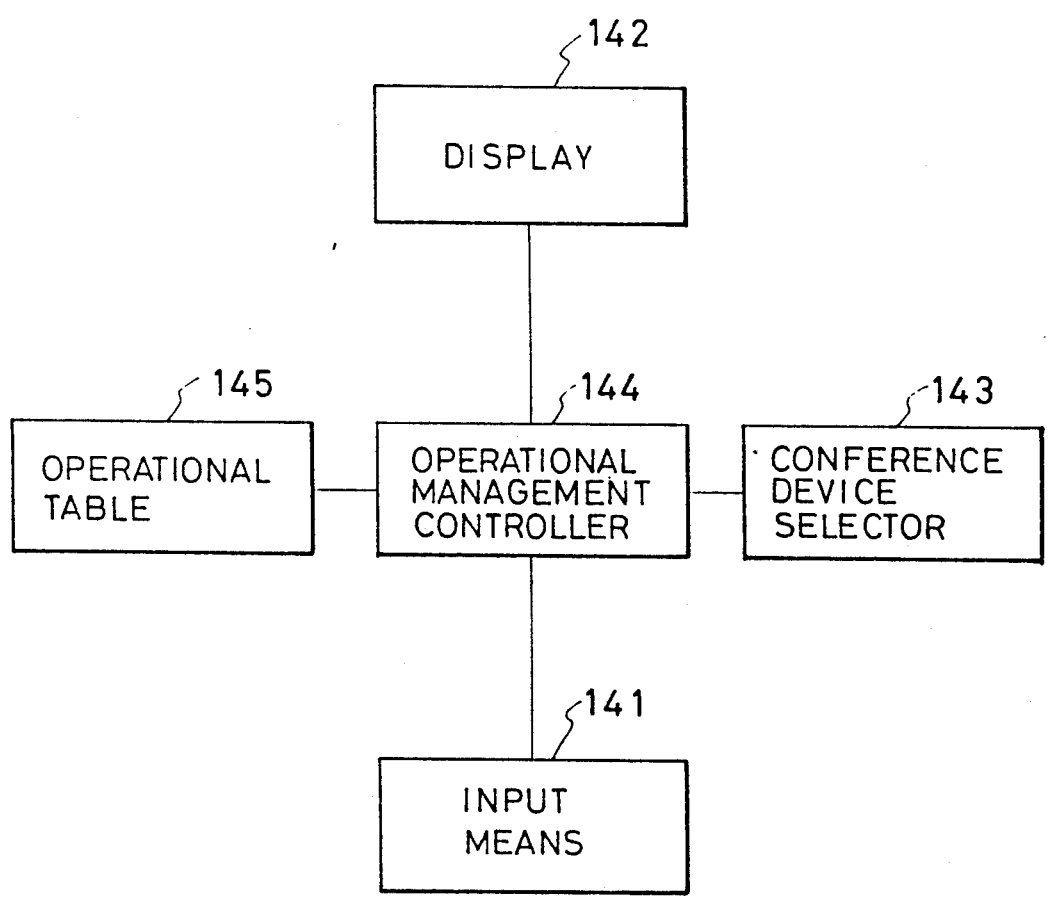
FIG. 16 is a block diagram showing the configuration of an example of an operational management device used in the embodiment of FIG. 14.

The operational management device 108 may, for example, be configured as shown in FIG. 16. It may be in the form of a programmed personal computer, and comprise an input means, such as a keyboard 141 for inputting operational management data, an image display, such as a CRT 142 for outputting data concerning operational management.

A conference device selector 143 designates one of the conference devices 105 that are connected to the operational management device 108, and transmits and receives data to and from the designated conference device. An operational management control means 144 has the function of controlling starting and ending of conferences. An operational table 145 stores conference information for control of starting and ending of conferences, and may, for example, be configured as shown in FIG. 17.

Figure 17:
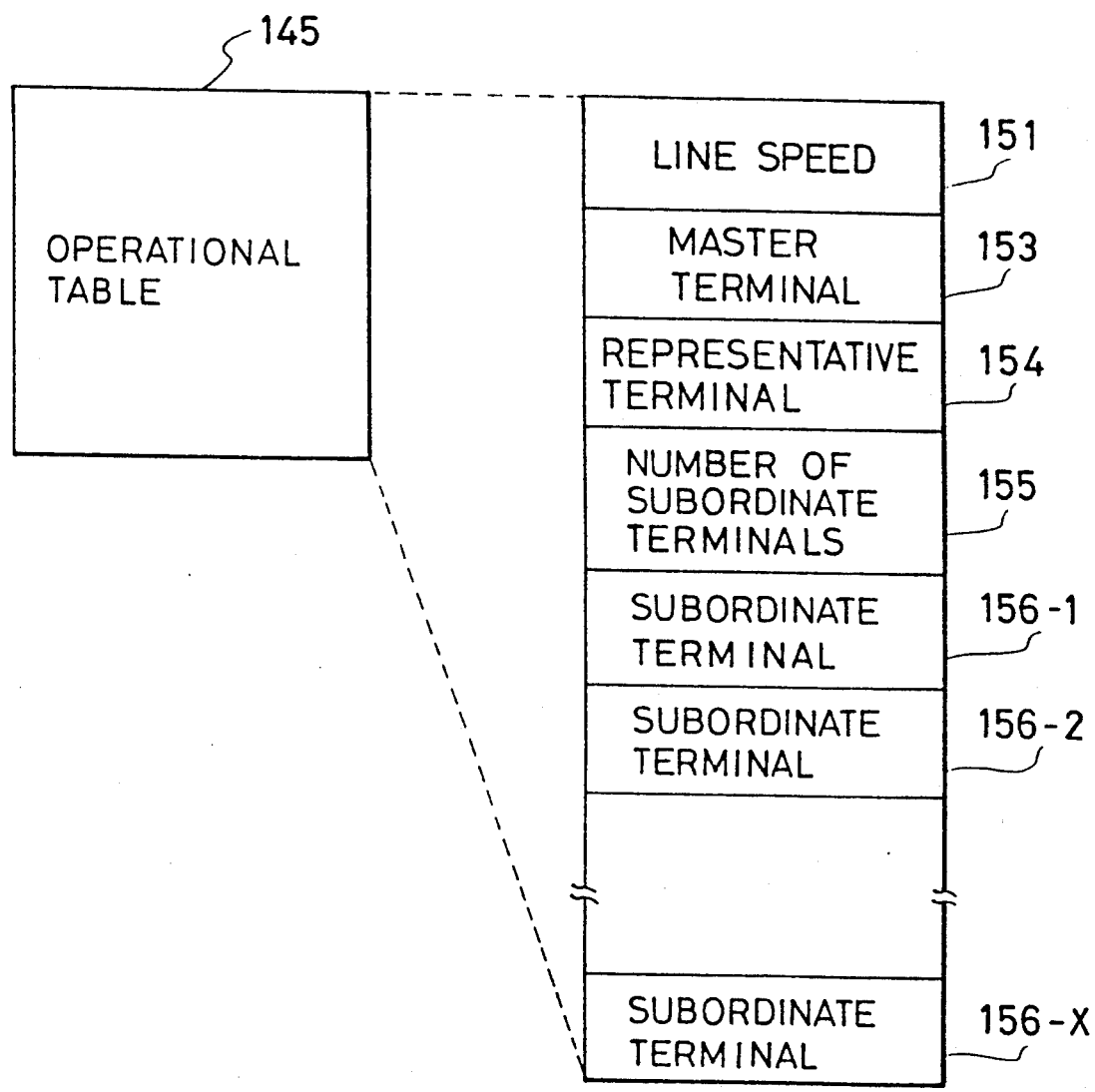
FIG. 17 is an explanatory drawing showing an example of the operational table used in the embodiment of FIG. 14.

As illustrated in FIG. 17, each operational table 145 includes a field 151 indicating the line speed and corresponding to the line speed field 129 in the conference table 115, a field 153 indicating the master terminal and corresponding to the master terminal field 123, a field 154 indicating the representative terminal and corresponding to the representative terminal field 124, a field 155 indicating the number of the subordinate terminals and corresponding to the subordinate terminal number field 125, and fields 156-1 to 156-X indicating the subordinate terminals and corresponding to the fields 126-1 to 126-M for the subordinate terminals.

The operational management device 108 performs control over starting and ending of conferences through modification of the content of each of the conference tables 115 for the respective conference devices 105 by referring to the contents of its own operational table 145.

At the starting time for a multi-location conference conference, the television conference terminals 106 and 107 participating in that specific conference are designated by inputting, by means of the inputting means 141 and the display means 142, information in the master terminal field 153, the representative terminal field 154, the subordinate terminal number field 155, and the subordinate terminal fields 156-1 to 156-X in the operational table 145 of the operational management device 108.

The operational management control means 144 then investigates the line speed of each of the subordinate terminals 156-1 to 156-X designated by the information in the master terminal field 153 and the subordinate terminal fields 156-1 to 156-X. If there is even one television conference terminal (107) having a line speed of 2B only, the conference line speed is set at 2B. Otherwise, it is set at either $H_0$ or 2B.

Once the line speed has been determined for a specific conference, a sequential search is made through the conference devices 105 in the order predetermined for each of the line speed, e.g., in descending order (from head to tail) of the conference device 105-1, 105-2, ..., 105-L, if the line speed is at 2B, or in ascending order (from tail to head) of 105-L, 105-(L-1), ..., 105-1, if the line speed is $H_0$ as to whether or not it is possible for the conference device to convene the specific conference with the determined line speed. This decision is made whether there are enough vacant lines for connecting the conference terminals which are to participate in the conference. The first conference device 105 for which an "OK" decision is returned, becomes the conference device which will hold the conference. When the decision for the line speed $H_0$ is "NG" for all the conference devices, another check for the line speed of 2B is run and the first conference device 105 for which an "OK" decision is returned becomes the conference device which will hold the conference.

Figure 18:
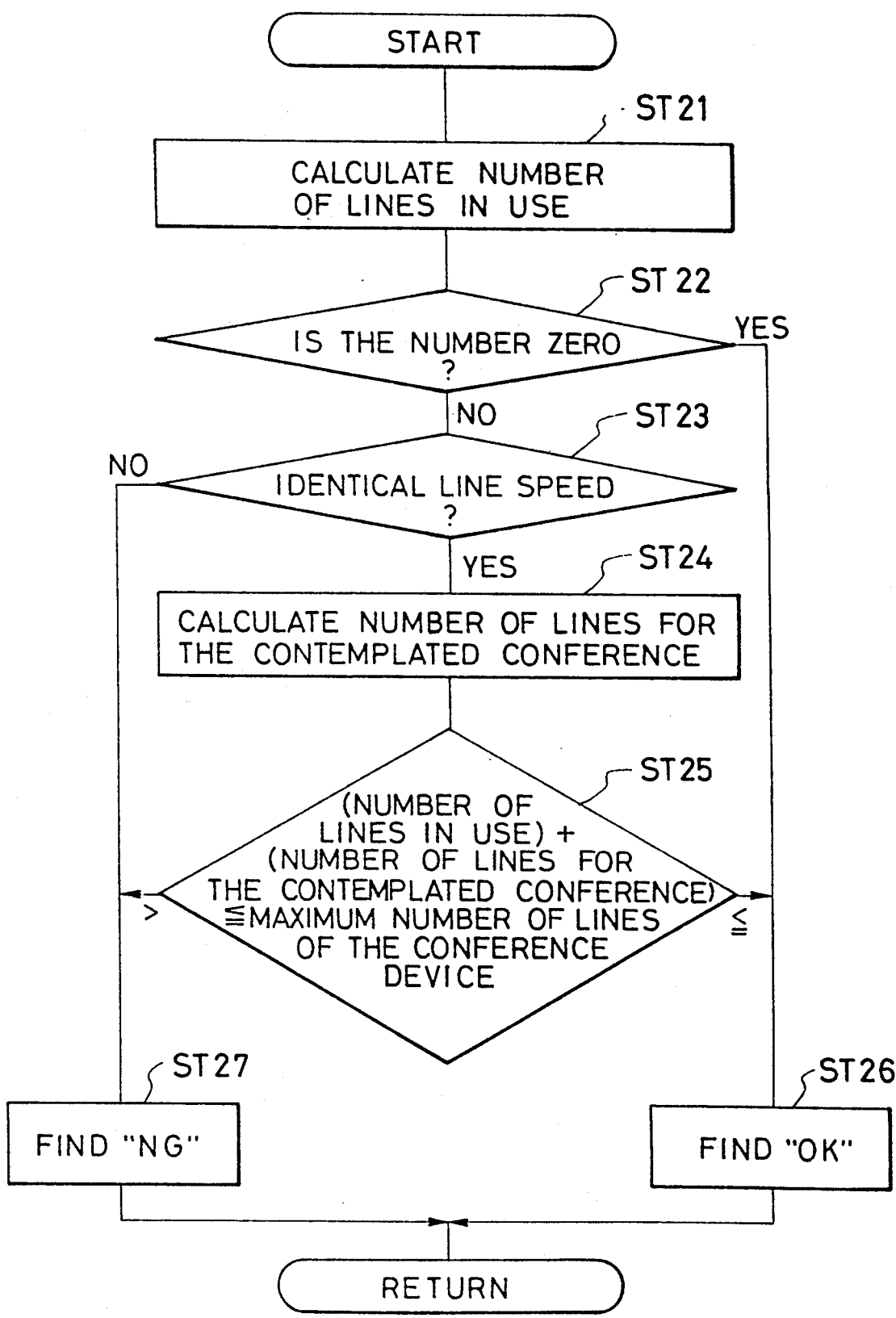
FIG. 18 is a flow chart showing the processing procedures for checking whether it is possible to convene a conference or not.

FIG. 18 is a flow chart showing the procedures for checking whether it is possible to convene a conference or not. First, the conference device 105 that is to be checked is designated by the conference device selector 143.

The step ST21 is carried out with reference to the contents of the conference table 115 of that specific conference device 105. That is, in this step ST21, it is determined that the number of the television conference terminals 106 and 107 that are participating in the conference in progress is M+1 from the contents "M" in the subordinate terminal number field 124 in the conference information 120 whose conference status 121 is at "1" indicating the conference being in progress is stored. This process is repeated, and the sum for the conference device 105 that is checked.

Next, at step ST22, a check is made of the number of lines in use as determined at step ST21, and processing proceeds to step ST23 if the number is not "0", and to step ST26 if it is "0". At step ST23, a comparison is made between line speed 151 in the operational table 145 and the conference line speed 129 in the conference table 115, and processing proceeds to step ST24 if they are the same and to step ST27 if they are different.

At step ST24, determination calculation is made of the number of lines required for the specific multi-location conference. That is, from the contents "X" (the number of the subordinate terminals that are to participate in the contemplated conference) in the subordinate terminal number field 155 in the operational table 145 of the operational managing device 108, the number of lines required for the conference is known to be (X+1).

Next, at step ST25, the sum of the number ($\Sigma(M+1)$) of lines in use found in step ST21 and the number $(x+1)$ of lines required for the contemplated conference found in step ST24 is compared with the maximum number of lines available on the checked conference device 105, and processing moves to step ST27 if the former is greater than the latter, and moves to step ST26 if the former is not greater that the latter At step ST26, a decision of "OK" to convene the conference by means of the checked conference device is returned, or, at step ST27, and "NG" decision is returned. When the decision is "OK", the checked conference device 105 is assigned to convene the multilocation conference in accordance with the content of operational table 145. In the case of the "NG" decision, another conference device is checked. The checking procedure is repeated for all the conference devices, for each of the line speeds $H_0$ and 2B.

Figure 19:
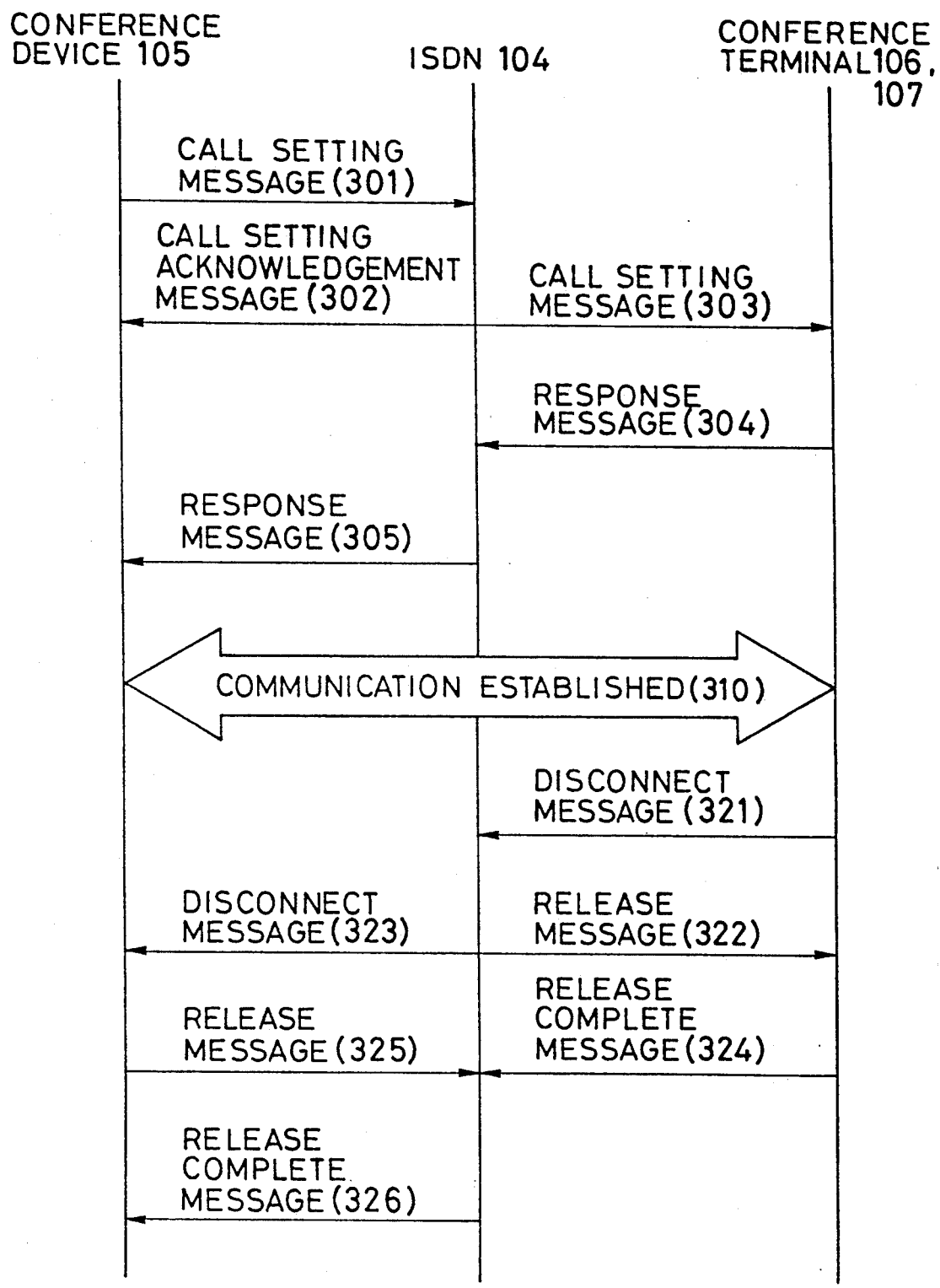
FIG. 19 is a timing diagram showing the basic call control sequences in the embodiment of FIG. 14.

FIG. 19 shows the basic call control sequences for starting and ending a conference. The conference device 105 sets calls, using the D channel of the ISDN 104, with the television conference terminal 106 or 107 that is to participate in the conference. The conference device 105 issues a call with the setting message (301) which includes the called party's number of the conference terminal 106 or 107, and with the user-to-user information which includes information on whether line speed is 2B or $H_0$.

When the ISDN 104 receives the call setting message 301, it responds to the conference device 105 with a call setting acknowledgement message 302 and sends a call setting message 303 to the television conference terminal 106 or 107 to which the call is addressed.

Using the user-to-user information in the call setting message 303, the television conference terminal 106 or 107 determines whether the line speed is 2B or $H_0$, and, when it can connect with the ISDN 104, sends a response message 304 to the ISDN 4 at that line speed.

When, however, a call setting message 303 having user-to-user information that designates a line speed of $H_0$ is received by a television conference terminal 107, which has only 2B line speed capability, the terminal cannot connect to the ISDN 104 and therefore sends a disconnect message 321 to the ISDN 104, using the D channel.

When the ISDN 104 receives the response message 304, it sends a response message 305 to the conference device 105, so that communication is established between the conference device 105 and the television conference terminal 106 or 107 (310).

The disconnect sequence is initiated by a disconnect message 321 from the television conference terminal 106 or 107 or from the conference device 105. Suppose, for example, that a disconnect message 321 is sent to the ISDN 104 from the television conference terminal 106 or 107. Upon receiving the disconnect message 321, the ISDN 104 sends a release message 322 to the television conference terminal 106 or 107 and a disconnect message 323 to the conference device 105.

When the television conference terminal 106 or 107 receives the release message 322, it sends a release complete message 324 to the ISDN 104, completing the disconnection. When the conference device 105 receives the disconnect message 323 from the ISDN 104, it sends a release message 325 to the ISDN 104 and receives from the ISDN 104 a release complete message 326. Thus, the disconnection is completed.

Description has been made in connection with one of the television conference terminals. But disconnection of each of other television conference terminals is made in the same way.

In the state (310) in which the communication is established between the conference device 105 and the television conference terminals 106 and/or 107 participating in the specific conference, the audio and video signals in the form of analog signals of the participating persons will be input at the television conference terminals, using a conference data inputting means including a microphone and a video camera.

These conference data in the form of analog signals are then converted at the terminal A/D converter 134 into digital signals. The digitized conference data are then sent via the terminal transceiver 133 to the ISDN 104, and to the conference device 105.

At the conference device 105, the conference data sent from the several conference terminal fields 126-1 to 126-M and/or 107 participating in the conference are received by the corresponding transceivers 111. The received conference data are then sent to the respective D/A converters 112, where they are converted to analog signals and are then sent to the conference data synthesizer 114.

The conference information synthesizer 114 performs synthetic processing on the conference data in accordance with the contents of the conference table 115, and sends the audio and video data obtained to the respective A/D converters 113, where they are converted to digital signals, and are then sent by the respective transceivers 111 via the ISDN 104 to the corresponding television conference terminals 106 and/or 107.

Like the conference data synthesizer 16 of FIG. 3, the conference data synthesizer 114 is capable of simultaneously performing synthetic processing for a plurality of conferences.

The audio data to be sent to each of the television conference terminals is obtained by mixing the analog signals from all of the conference terminals except the conference terminal in question. The video data to be sent to each of the subordinate terminals is obtained by selecting the video data from the master terminal or the video data from one of the subordinate terminals making a speech. The video data to be sent to the master terminal is obtained by selecting the video data from the representative terminal or the video data from one of the subordinate terminals making a speech.

The synthetic conference data is converted into digital signals and sent to the ISDN in the manner described above, and are then received by each of the conference terminals 106 and/or 107 that are participating in the conference. That is, each television conference terminal 106 or 107 receives conference data using its terminal transceiver 133, and the audio and video data are converted into analog signals by the D/A converter 135, and are output as sound and an image using a conference data outputting means 132 including a loudspeaker and an image display, such as a television monitor.

At the time for ending the conference, the information designated by the operational table 145 of the operational management device 108 is compared with the conference information 120 in the conference table 115 for each conference device 105. In other words, the operational master terminal 53 is compared with the master terminal 23. If they match, the conference status field 121 is reset to "0", thereby indicating the end of the conference.

As above described, in the Third Embodiment, when a multi-location conference is to convened, the conference device which should hold the conference is determined based on the line speed at which each of the conference terminals which are to participate in the conference can be connected to the communication network, the line speed at which each conference device can hold a conference, and the number of vacant lines of each conference device, by a sequential search conducted in an order that is predetermined in accordance with and different depending on the line speed. Accordingly, a multi-location television conference system in which vacancies in the conference device lines are effectively utilized can be realized.

Fourth Embodiment

Following is a description of a fourth embodiment of the invention. The overall configuration is identical to that shown in FIG. 14, but the configuration of the operational management device 108 differs. That is, the operation management device 108 of this embodiment is configured as shown in FIG. 20, in which those parts that are identical with those in FIG. 16 are designated with the same reference numerals, and their description is omitted.

Figure 20:
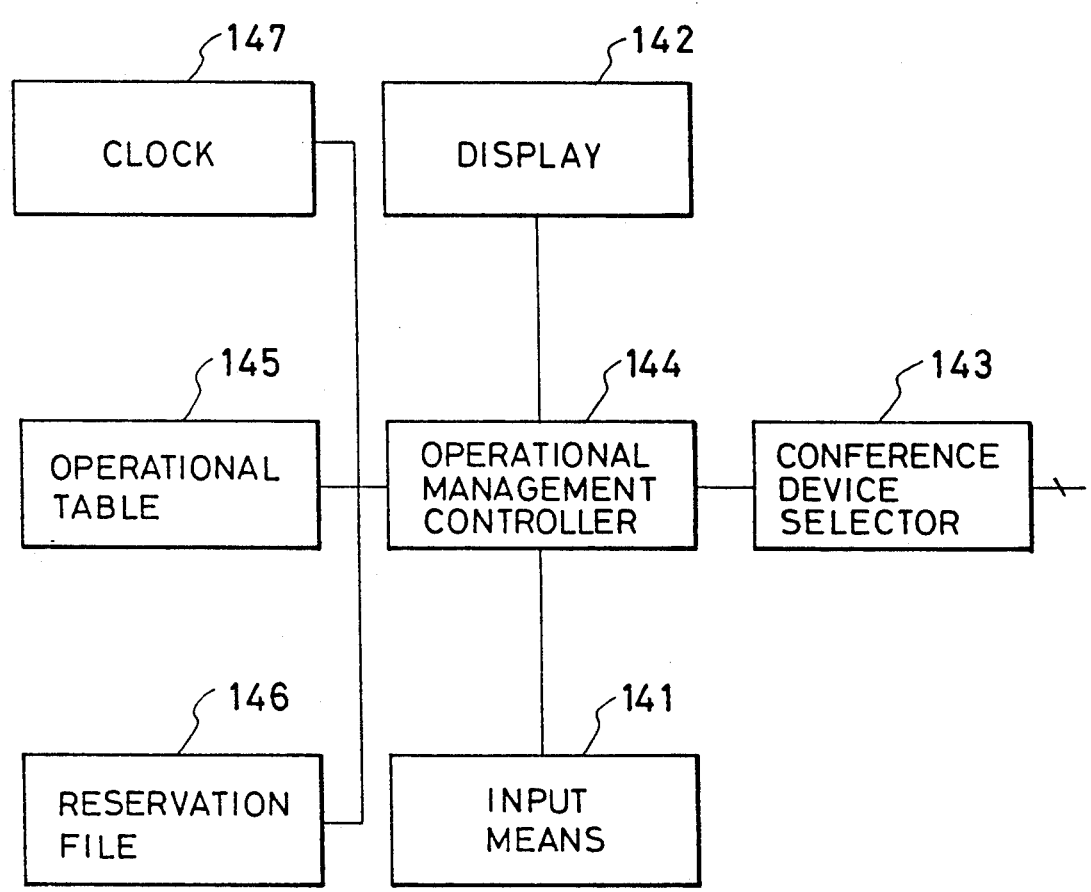
FIG. 20 is a block diagram showing the configuration of an example of an operational management device used in another embodiment of FIG. 14.

As shown in FIG. 20, the operational management device 108 of this embodiment is similar to that of FIG. 16, but is additionally provided with a reservation file 146 and a clock 147 indicating the current time.

Figure 21:
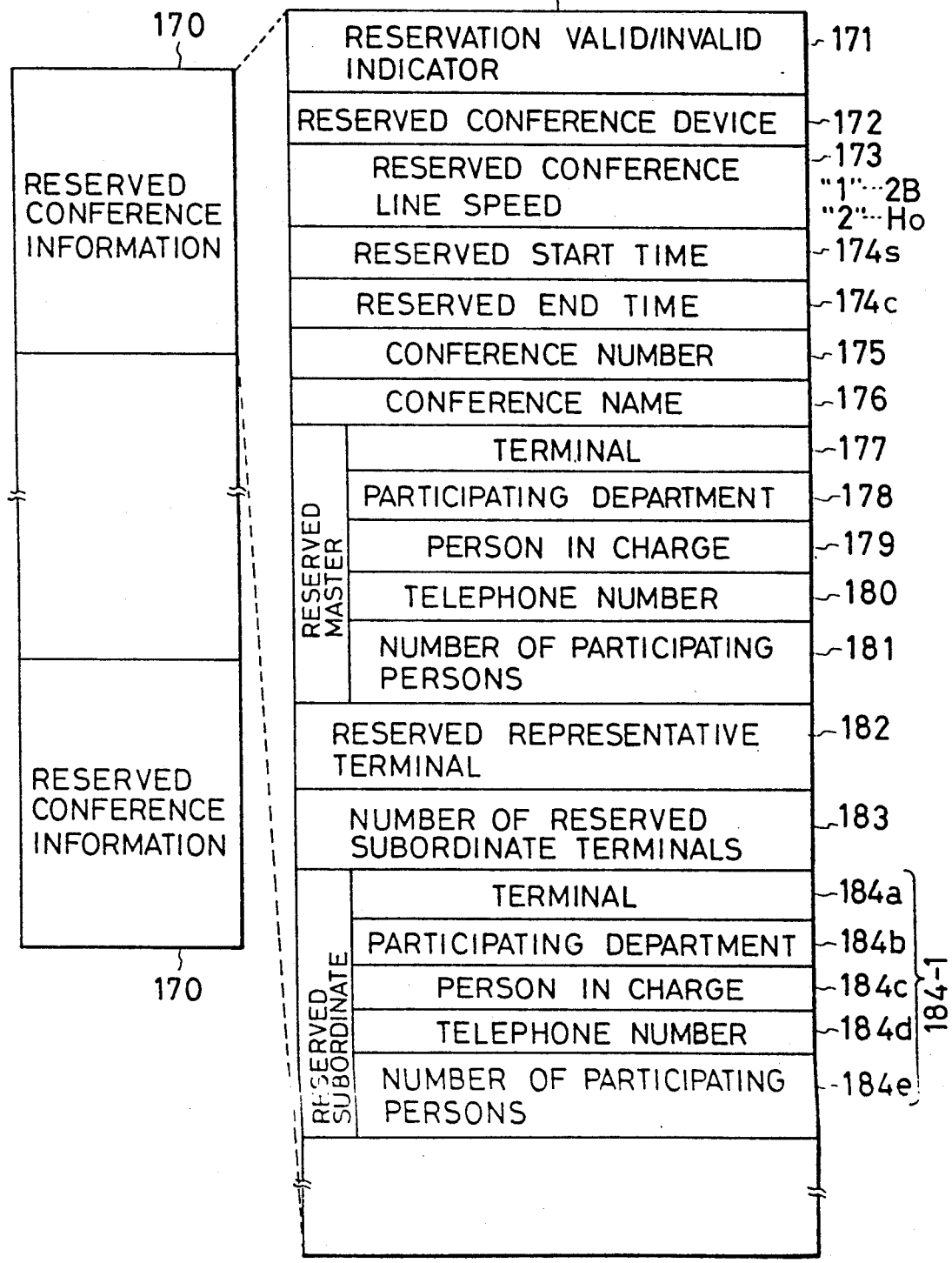
FIG. 21 is an explanatory drawing showing an example of a reservation file in the operational management device of FIG. 20.

As shown in FIG. 21, the reservation file 146 stores information on the participating departments, the person in charge, the telephone number and the number of participating persons. More specifically, as shown in FIG. 21, the reservation file 146 includes blocks of reserved conference information 170. Each block of the reserved conference information 170 includes a reservation valid/invalid indicator field 171 indicating whether a conference reservation is valid or not, and storing, for example, a "1" when there is a conference reservation and a "0" when there is not, a field 172 indicating the reserved conference device, a field 173 indicating reserved line speed, fields 174s and 174e indicating the reserved start time and end time respectively, a field 175 for a conference number in the form, for example, of four numeric characters, a field 176 for a conference name in the form, for example, of 20 "kanji" and/or alphanumeric characters, a field 177 for the reserved master terminal (acting as a host terminal), a field 178 for the participating department at the reserved master terminal in the form, for example, of six alphanumeric characters, a field 179 for the person in charge at the reserved master terminal, in the form, for example of 10 "kanji" and/or alphanumeric characters, a field 180 for the reserved master terminal telephone number in the form, for example, of 20 numeric characters, and a field 181 for the number of persons participating at the master terminal in the form, for example, of two numeric characters.

The reserved conference information 170 further includes a field 182 for the reserved representative terminal, which is one of the reserved subordinate terminals 184-1 to 184-M and a field 183 for the number of reserved subordinate terminals.

The reserved conference information 170 further includes fields 184-1 to 184-M for the respective subordinate terminals No. 1 to No. M. Each of the fields 184-1 to 184-M includes a field 184a for identifying the reserved subordinate terminals which are scheduled to participate in the reserved conference, a field 184b for identifying the department (assuming that the conference is held between various departments of a corporation) at the reserved subordinate terminal in the form, for example, of six alphanumeric characters, a field 184c for identifying the person in charge at the reserved subordinate terminal in the form, for example, of ten "kanji" and/or alphanumeric characters, a field 184d for indicating the telephone number in the form, for example, of 20 numeric characters, and a field 184e for the number of participating persons at the terminal in the form, for example, of two numeric characters.

The conference device 105, the television conference terminals 106 and/or 107, the ISDN 104 and the operational management device 108 operate in a similar manner to those in the Third Embodiment, except as noted below.

When the conference starts, the operational management device 108 uses its clock function 147 to determine the current time, and compares the reserved start time 174s with the current time. If there is reserved conference information of which the reserved start time 174s and the current time match, the contents in the field 173 for the reserved line speed is set in the field 129 for the conference line speed in the conference table 115 in the conference device 105 designated by the field 172 for the reserved conference device.

This is followed by the transfer (copying) of the contents of the reserved conference information 170 of the reservation file 146 to the conference terminal information 120 of the conference table 115, specifically, the contents of the field 177 for the reserved master terminal to the field 123 for the master terminal, the contents of the field 182 for the reserved representative terminal to the field 124 for the representative terminal, the contents of the field 183 for the number of reserved subordinate terminals to the field 125 for the number of subordinate terminals, and the contents of the fields 184-1 to 184-M for the reserved subordinate terminals to the fields 126-1 to 126-M for the subordinate terminals, and the setting of the conference status 121 of the conference table 115 to the value "1", indicating a conference in progress.

Similarly, at the end of the conference, the operational management device 108 determines the current time from its clock 147, and if there is reserved conference information 170 in the reservation file 146 of which the reserved end time 174e matches the current time, value "0" (indicating "no conference") is set in the conference status 121 in that conference information, and a command for ending the conference is issued.

Following is a description of the procedures for creating, modifying and deleting information in the reservation file 146. To create a new block of conference information, a value "0" indicating no reservation is first stored in the reservation valid/invalid indicator field 171 of the reserved conference information 170, after which input is made to the respective fields, from the field 174s for the reserved start time to the fields 184-1 to 184-M for the respective subordinate terminals, using the display means 144 and the inputting means 141.

Next, the reserved line speed to be stored in the field 173 is determined. This is done by investigating the line speed of each of the reserved master terminal in the field 177 and the reserved subordinate terminals in the fields 184-1 to 184-M, and, if one or more terminals have only 2B line speed capability, the line speed of 2B is designated. Otherwise, the line speed of $H_0$/2B, meaning that the conference may be performed at either of the of the line speeds (depending on the available conference device), is written in.

Once the line speed for the conference has been determined, a check is run as to whether or not it is possible to reserve the conference by means of each of conference devices 105, in the priority sequence previously determined by the line speed, for example, in ascending order (105-1, 105-2, . . . , 105-L) if line speed is 2B, or in descending order (105-L, 105-(L-1), . . . , 105-1) if the line speed is $H_0$. The first conference device 105 for which an "OK" decision is returned while the check is run for the line speed of $H_0$ will be selected and reserved for the conference. When the decision is "NG" with all the conference devices for the line speed of $H_0$, then another check is run with a line speed of 2B, and the first conference device 105 for which an "OK" decision is returned will be selected and reserved for the conference.

Once the conference device reserved for the conference has been determined, its number is stored in the field 172 for the reserved conference device of the reserved conference information 170 in the reservation file 146, and a value "1" indicating "conference reserved" is stored in the field 171 for the reservation valid/invalid indicator. With this, the creation of a new conference information is complete.

Figure 22:
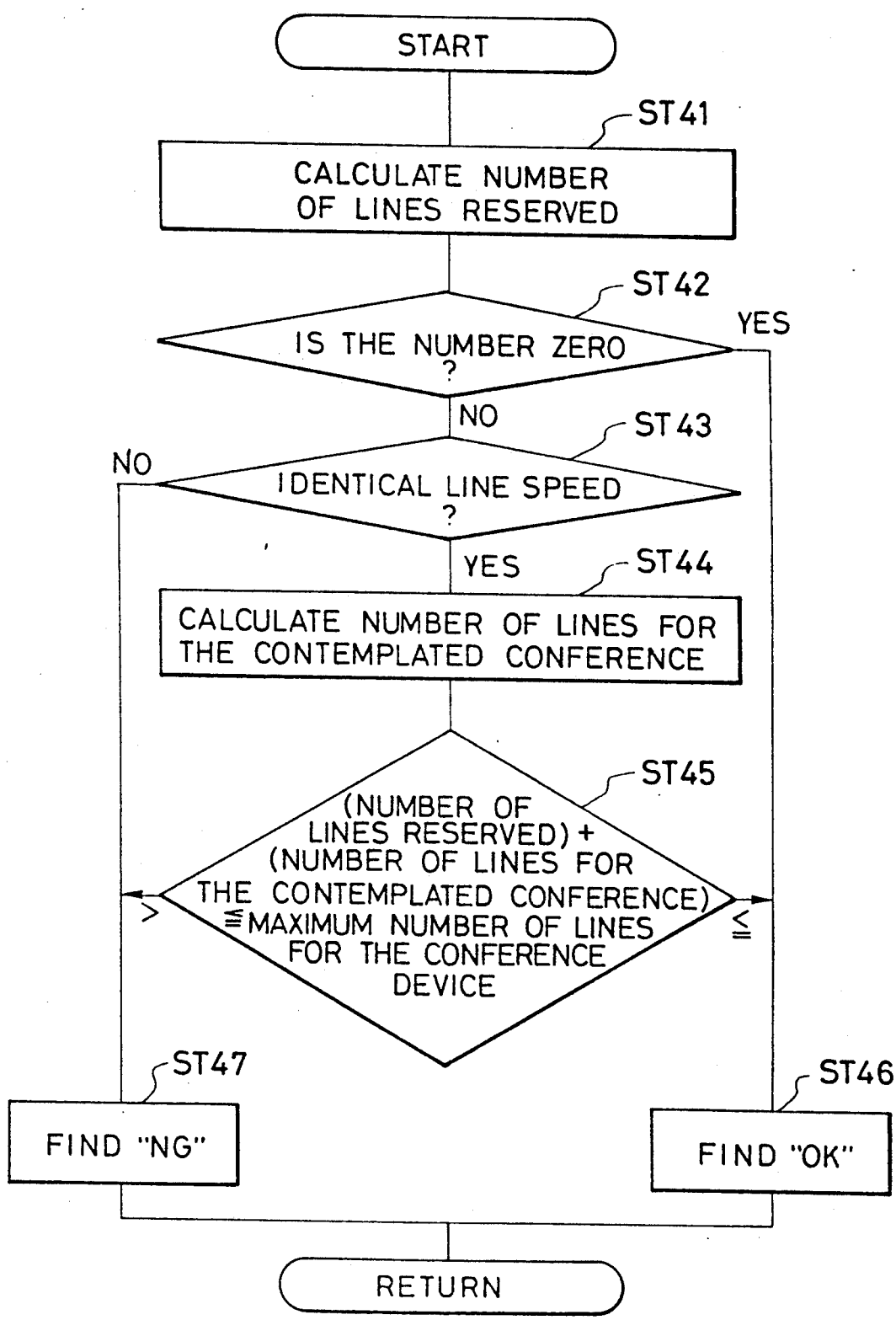
FIG. 22 is a flow chart showing the processing procedures for checking whether it is possible to make a conference reservation or not.

FIG. 22 is a flow chart showing the procedure for checking whether it is possible to create a new conference reservation or not.

First of all, the reservation status of the conference device 105 is checked by referring to the reserved conference information 170 of the reservation file 146. That is, at ST41, from the reserved subordinate terminal number M in the field 183 in the reserved conference information 170 of which a value "1", indicating "conference reserved" is stored in the reservation valid/invalid indicator in the field 171 and of which the reserved conference device in the field 172 conforms to the conference device 105, it is found that the number of the conference terminals 106 and/or 107 participating in the conference is M+1. This is repeated to determine the sum for the conference device in question. In this way, the total number of lines reserved is known. The line speed for which the conference device 105 in question has been reserved is also known from the content in the field 173.

Next, in step ST42, the total number of reserved lines is checked, and the processing proceeds to step ST43 if it is not "0", and to step ST46 if it is "0". At step ST43, the line speed for which the check is being made, i.e., the line speed with which the reservation is to be made, and the reserved line speed in the field 173 obtained at step ST11 are compared. Processing then proceeds to step ST44 if they are identical, and to step ST47 if they are different.

In step ST44, the number of lines required for the contemplated conference is calculated. From the content "x" in the field 183 for the number of reserved subordinate terminals of the contemplated conference, this calculation finds that the number of lines required for the contemplated conference is "x+1".

Next, in step ST45, the sum of the number of reserved lines found in step ST41 and the number of lines for the contemplated conference found in step ST44 is compared with the maximum number of lines on that conference device 105, and processing proceeds to step ST47 if the former is greater than the latter, and to step ST46 if the former is not greater than the latter.

At step ST46, a decision of "OK" to reserve the conference is returned, or, at step ST47, a "NG" decision is returned. The above completes the procedure by which a check is made as to whether or not it is possible to make the conference reservation.

In modifying reservation file 146, a value "0", indicating "no reservation" is first stored to valid/invalid indicator field 171 of the subject reserved conference record 170, and the contents in the fields of the reserved conference that are to be modified, from the fields 171 to 183, and the fields 184a to 184e in each of the fields 184-1 to 184-M, are displayed on the display means 144, and are modified using the inputting means 141. Then, in the same way as when creating a new reserved conference information 170, the reserved conference device in the field 172 and the reserved line speed in the field 173 are determined and value "1" indicating "conference reserved" is stored in the valid/invalid indicator field 171, completing the modification process.

To delete a block of reserved conference information, value "0" indicating "no reservation" is stored in the valid/invalid indicator field 171 of reserved conference record 170.

In the Fourth Embodiment, when a multi-location television conference is to be reserved, the conference device which the conference should be reserved for the conference is determined or selected based on the line speed at which each of the television conference terminals which are to participate in the conference can be connected to the communication network, as well as the line speed and the number of vacant lines of each of the conference devices during the time from the start to the end of the contemplated conference, by a sequential search. The sequential search is conducted in an order that is predetermined for and different depending on the line speed, so that a multi-location television conference system in which vacancies in the lines on the conference devices are effectively utilized can be realized.

Fifth Embodiment

In the Third and Fourth Embodiments above described, the operational management device 108 is shown to be provided with an inputting means 141 and a display means 142. But it is equally possible to provide the operational management 108 with a modem connected to a subscriber telephone line, and to provide a device having an inputting means and a display means composed, for example, of a personal computer, with a modem connected to the subscriber telephone line, thereby performing the functions of the inputting means 141 and the display means 142 of the operational management device 108, and effects similar to those obtained with the above described embodiment will be obtained.

Sixth Embodiment

Further, in the various embodiments above described, an ISDN is used as an example of a communications network, and the line speed is described in terms of two alternatives, 2B and $H_0$, it is equally possible to use a line speed of $H_{11}$ (1,536 kbps). It is also possible to use a dedicated line. Yet, effects similar to those obtained with the above described embodiments will be obtained.

What is claimed is:

1. A multi-location conference system comprising:
   a plurality of conference terminals performing input and output of conference data consisting of video and audio signals;
   a conference device which is connected to said plurality of conference terminals and which includes means for holding conferences between said plurality of conference terminals by processing conference data sent to said conference device from said plurality of conference terminals to produce synthetic conference data and sending said synthetic conference data to said plurality of conference terminals, wherein said conference device is further provided with a conference table storing conference information for the conference terminals participating in conferences being held; and
   a reservation center operably connected to said conference device for registering conference terminal information in said conference table and deleting conference terminal information from said conference table at times designated in accordance with reserved conference information collected in advance for the respective conferences, thereby controlling automatically starting and ending of each of the conferences.

2. The system of claim 1, wherein said conference device is capable of holding a plurality of conferences simultaneously.

3. The system of claim 1, further comprising a reservation terminal connected with said reservation center via a communication line; wherein
   said reserved conference information comprises a reservation decision information requisite for making the decision as to whether to accept or reject the reservation, and reservation detail information required for control over performing the conference;
   said reservation terminal sends the reservation decision information via a communication line to said reservation center;
   said reservation center makes, responsive to the reservation decision information, a decision as to whether to accept or reject the reservation at said reservation center, and sends the result of decision from said reservation center to said reservation terminal; and
   said reservation terminal sends, if the result of the decision is to accept the reservation, the reservation detail information to said reservation center, thereby to achieve the registration of said reserved conference information to the reservation center.

4. A multi-location television conference system comprising:
   a plurality of first television conference terminals that can be connected to a communication network at a first line speed;
   a plurality of second television conference terminals that can be connected to said communication network at a second line speed;
   a plurality of conference devices which are connected by a plurality of lines to said communication network, and which are capable of simultaneously holding multi-location conferences at a selected one of said first and second line speeds; and
   an operational management device for controlling starting and ending of a multi-location conference, to which said conference devices are connected, which determines, at the time of convening said multi-location conference, the conference device which is to hold the conference by searching for the conference device which can hold the conference at the line speed with which the television conference terminals participating in the conference can be connected, and determines the line speed and the number of vacant lines of each of the conference devices in a different predetermined order depending on the specific line speed.

5. The system of claim 4, wherein the order predetermined for said first line speed is sequential in descending order and the order for said second line speed is sequential in ascending order.

6. The system of claim 4, wherein said first conference terminals can also be connected to a communication network with said second line speed.

7. A multi-location television conference system comprising:
- a plurality of first television conference terminals that can be connected to a communication network at a first line speed;
- a plurality of second television conference terminals that can be connected to said communication network at a second line speed;
- a plurality of conference devices which are connected by a plurality of communication lines to said communication network, and which are capable of simultaneously holding multi-location conferences at a selected one of said first and second line speeds; and
- an operational management device to which said conference devices are connected, including
  - a reservation file for storing reserved conference information including a starting time and an ending time of each multi-location conference,
  - a clock by which it is possible to indicate the current time, and
  - means for reserving a conference device for holding a multi-location conference, and which controls starting and ending of the conference;

wherein, at the time of reserving a multi-location conference, said operational management device determines, in accordance with the number of conference terminals which are to participate in the conference, the line speed at which the reservation has been made for each conference device, and the number of vacant lines of each conference device, the conference device which is to be reserved for the conference by searching for the conference device which can hold the conference with the line speed at which the television conference terminals which are to participate in the conference can be connected, wherein said search is made in a different predetermined order dependent on the specific line speed.

8. The system of claim 7, wherein the order predetermined for said first line speed is sequential in descending order and the order for said second line speed is sequential in ascending order.

9. The system of claim 7, wherein said first conference terminals can also be connected to a communication network with said second line speed.

* * * * *

UNITED STATES PATENT AND TRADEMARK OFFICE
CERTIFICATE OF CORRECTION

PATENT NO. : 5,323,445
DATED : June 21, 1994
INVENTOR(S) : Kunio Nakatsuka

It is certified that error appears in the above-identified patent and that said Letters Patent is hereby corrected as shown below:

Col. 3, line 32, "conference" should be --conferences--.

Col. 6, line 47, "3$\overline{rs}$-1" should be --3$rs$-2--.

Col. 9, line 67, "filed" should be --field--.

Col. 14, line 8, "that the latter" should be --than the latter.--

Col. 15, line 50, after "ISDN" insert --104--.

Signed and Sealed this

Twentieth Day of December, 1994

Attest:

BRUCE LEHMAN

Attesting Officer    Commissioner of Patents and Trademarks